United States Patent
Schwandt et al.

(10) Patent No.: US 8,114,183 B2
(45) Date of Patent: *Feb. 14, 2012

(54) SPACE OPTIMIZED COALESCER

(75) Inventors: Brian W. Schwandt, Fort Atkinson, WI (US); Barry M. Verdegan, Stoughton, WI (US); Roger L. Zoch, McFarland, WI (US); Jeffrey A. Fedorowicz, Madison, WI (US); Kurt M. A. Badeau, Evansville, WI (US); Robert E. Muse, Cookeville, TN (US); Peter K. Herman, Cookeville, TN (US)

(73) Assignee: Cummins Filtration IP Inc., Minneapolis, MN (US)

( * ) Notice: Subject to any disclaimer, the term of this patent is extended or adjusted under 35 U.S.C. 154(b) by 1137 days.

This patent is subject to a terminal disclaimer.

(21) Appl. No.: 11/346,679

(22) Filed: Feb. 3, 2006

(65) Prior Publication Data

US 2007/0062887 A1   Mar. 22, 2007

Related U.S. Application Data

(63) Continuation-in-part of application No. 11/273,101, filed on Nov. 14, 2005, and a continuation-in-part of application No. 11/230,694, filed on Sep. 20, 2005.

(51) Int. Cl.
*B01D 46/00* (2006.01)
(52) U.S. Cl. .................. 55/498; 55/529; 55/DIG. 19
(58) Field of Classification Search .............. 55/423, 55/498, 486–487, 527–529; 210/799
See application file for complete search history.

(56) References Cited

U.S. PATENT DOCUMENTS

| | | | | |
|---|---|---|---|---|
| 2,781,913 A | * | 2/1957 | Thompson | 210/336 |
| 3,352,423 A | * | 11/1967 | Osterman | 210/496 |
| 3,645,398 A | | 2/1972 | Flocco | |
| 3,755,527 A | | 8/1973 | Keller | |
| 3,801,400 A | | 4/1974 | Vogt et al. | |
| 3,841,953 A | | 10/1974 | Lohkamp et al. | |
| 3,870,640 A | | 3/1975 | Reece | |
| 3,904,798 A | | 9/1975 | Vogt et al. | |
| 3,933,557 A | | 1/1976 | Pall | |
| 3,938,973 A | | 2/1976 | Kershaw | |
| 3,949,130 A | | 4/1976 | Sabee et al. | |
| 3,971,373 A | | 7/1976 | Braun | |
| 3,972,759 A | | 8/1976 | Buntin | |
| 3,978,185 A | | 8/1976 | Buntin et al. | |
| 4,048,364 A | | 9/1977 | Harding et al. | |

(Continued)

FOREIGN PATENT DOCUMENTS

EP            0325854         4/1993

(Continued)

OTHER PUBLICATIONS

S. F. Moses and K. M. Ng, "*A Visual Study of the Breakdown of Emulsions in Porous Coalescers*", Chemical Engineering Science, vol. 40, No. 12; pp. 2339-2350, 1985.

(Continued)

*Primary Examiner* — Duane Smith
*Assistant Examiner* — Ives Wu
(74) *Attorney, Agent, or Firm* — Andrus, Sceales, Starke & Sawall, LLP

(57) ABSTRACT

A coalescer is provided minimizing trade-offs among high removal efficiency, low pressure drop, long service life, and small size.

36 Claims, 9 Drawing Sheets

U.S. PATENT DOCUMENTS

| | | | |
|---|---|---|---|
| 4,078,124 A | | 3/1978 | Prentice |
| 4,102,785 A | * | 7/1978 | Head et al. ............... 210/767 |
| 4,116,738 A | | 9/1978 | Pall |
| 4,116,739 A | | 9/1978 | Glenn |
| 4,192,919 A | | 3/1980 | Raghavachari |
| 4,253,954 A | | 3/1981 | Midkiff et al. |
| 4,282,097 A | | 8/1981 | Kuepper et al. |
| 4,416,782 A | | 11/1983 | Kerres |
| 4,524,000 A | | 6/1985 | Clayfield et al. |
| 4,594,202 A | | 6/1986 | Pall et al. |
| 4,668,393 A | | 5/1987 | Stone |
| 4,689,058 A | | 8/1987 | Vogt et al. |
| 4,726,901 A | | 2/1988 | Pall et al. |
| 4,859,348 A | | 8/1989 | Jusaitis et al. |
| 4,874,339 A | | 10/1989 | Bratz |
| 4,878,929 A | | 11/1989 | Tofsland et al. |
| 4,888,117 A | * | 12/1989 | Brown et al. ............... 210/649 |
| 4,892,667 A | * | 1/1990 | Parker et al. ............... 210/799 |
| 4,995,974 A | | 2/1991 | Lorey et al. |
| 5,061,170 A | | 10/1991 | Allen et al. |
| 5,075,068 A | | 12/1991 | Milligan et al. |
| 5,122,048 A | | 6/1992 | Deeds |
| 5,145,689 A | | 9/1992 | Allen et al. |
| 5,174,907 A | | 12/1992 | Chown et al. |
| 5,227,172 A | | 7/1993 | Deeds |
| 5,236,641 A | | 8/1993 | Allen et al. |
| 5,254,297 A | | 10/1993 | Deeds |
| 5,269,670 A | | 12/1993 | Allen et al. |
| 5,273,565 A | | 12/1993 | Milligan et al. |
| 5,296,061 A | | 3/1994 | Ando et al. |
| 5,306,321 A | | 4/1994 | Osendorf |
| 5,340,479 A | | 8/1994 | Szczepanski et al. |
| 5,401,458 A | | 3/1995 | Wadsworth et al. |
| 5,409,642 A | | 4/1995 | Allen et al. |
| 5,411,576 A | | 5/1995 | Jones et al. |
| 5,419,953 A | | 5/1995 | Chapman |
| 5,427,597 A | | 6/1995 | Osendorf |
| 5,454,848 A | | 10/1995 | Miller |
| 5,470,663 A | | 11/1995 | Wadsworth et al. |
| 5,472,481 A | | 12/1995 | Jones et al. |
| 5,480,547 A | * | 1/1996 | Williamson et al. ......... 210/533 |
| 5,501,872 A | | 3/1996 | Allen et al. |
| 5,591,335 A | | 1/1997 | Barboza et al. |
| 5,605,706 A | | 2/1997 | Allen et al. |
| 5,618,566 A | | 4/1997 | Allen et al. |
| 5,667,562 A | | 9/1997 | Midkiff |
| 5,672,232 A | | 9/1997 | Clack |
| 5,681,469 A | | 10/1997 | Barboza et al. |
| 5,733,581 A | | 3/1998 | Barboza et al. |
| 5,750,024 A | | 5/1998 | Spearman |
| 5,800,706 A | | 9/1998 | Fischer |
| 5,913,851 A | | 6/1999 | Gryskiewicz et al. |
| 5,916,678 A | | 6/1999 | Jackson et al. |
| 5,972,063 A | | 10/1999 | Dudrey et al. |
| 5,994,482 A | | 11/1999 | Georgellis et al. |
| 6,018,962 A | * | 2/2000 | Dewhirst et al. .............. 62/468 |
| 6,019,809 A | | 2/2000 | Kahlbaugh et al. |
| 6,093,231 A | | 7/2000 | Read et al. |
| 6,114,017 A | | 9/2000 | Fabricante et al. |
| 6,117,322 A | | 9/2000 | Miller et al. |
| 6,123,061 A | * | 9/2000 | Baker et al. ................. 123/573 |
| 6,136,076 A | | 10/2000 | Read |
| 6,146,580 A | | 11/2000 | Bontaites, Jr. |
| 6,171,369 B1 | | 1/2001 | Schultink et al. |
| 6,179,890 B1 | | 1/2001 | Ramos et al. |
| 6,290,739 B1 | * | 9/2001 | Gieseke et al. ............... 55/330 |
| 6,314,344 B1 | | 11/2001 | Sauer et al. |
| 6,315,805 B1 | | 11/2001 | Strauss |
| 6,332,987 B1 | * | 12/2001 | Whitney et al. ............. 210/799 |
| 6,342,283 B1 | | 1/2002 | Mozelack et al. |
| 6,358,417 B1 | | 3/2002 | Aune et al. |
| 6,387,141 B1 | | 5/2002 | Hollingsworth et al. |
| 6,387,144 B1 | | 5/2002 | Jaroszczyk et al. |
| 6,422,396 B1 | * | 7/2002 | Li et al. ..................... 210/489 |
| 6,423,227 B1 | | 7/2002 | Allen et al. |
| 6,432,175 B1 | | 8/2002 | Jones et al. |
| 6,485,535 B1 | | 11/2002 | Linnersten et al. |
| 6,488,801 B1 | | 12/2002 | Bodaghi et al. |
| 6,521,555 B1 | | 2/2003 | Bodaghi et al. |
| 6,544,310 B2 | | 4/2003 | Badeau et al. |
| 6,585,790 B2 | | 7/2003 | Linnersten et al. |
| 6,613,268 B2 | | 9/2003 | Haynes et al. |
| 6,662,842 B2 | | 12/2003 | Mozelack et al. |
| 6,736,274 B2 | | 5/2004 | Tremblay et al. |
| 6,797,025 B2 | | 9/2004 | Linnersten et al. |
| 6,811,588 B2 | | 11/2004 | Niakin |
| 6,838,402 B2 | | 1/2005 | Harris et al. |
| 6,860,917 B2 | | 3/2005 | Henrichsen et al. |
| 6,872,431 B2 | | 3/2005 | Kahlbaugh et al. |
| 6,916,353 B2 | | 7/2005 | Tang |
| 6,916,395 B2 | | 7/2005 | Aune et al. |
| 6,932,923 B2 | | 8/2005 | Nguyen |
| 6,938,781 B2 | | 9/2005 | Aune et al. |
| 6,989,193 B2 | | 1/2006 | Haile et al. |
| 7,128,835 B1 | * | 10/2006 | Hundley et al. ............. 210/243 |
| 7,309,372 B2 | * | 12/2007 | Kahlbaugh et al. ............. 55/527 |
| 7,314,497 B2 | | 1/2008 | Kahlbaugh et al. |
| 7,332,009 B2 | * | 2/2008 | Casey et al. ................... 55/423 |
| 7,520,913 B2 | * | 4/2009 | Mills et al. ................... 55/529 |
| 2002/0046656 A1 | | 4/2002 | Benson et al. |
| 2002/0070471 A1 | | 6/2002 | Lee |
| 2002/0073667 A1 | | 6/2002 | Barris et al. |
| 2002/0092423 A1 | | 7/2002 | Gillingham et al. |
| 2002/0187701 A1 | | 12/2002 | Healey |
| 2003/0010002 A1 | | 1/2003 | Johnson et al. |
| 2003/0080464 A1 | | 5/2003 | Aune et al. |
| 2003/0116874 A1 | | 6/2003 | Haynes |
| 2003/0203696 A1 | | 10/2003 | Healey |
| 2005/0082238 A1 | | 4/2005 | Larson |
| 2006/0186031 A1 | * | 8/2006 | Fick et al. ................... 210/235 |
| 2006/0242933 A1 | * | 11/2006 | Webb et al. .................. 55/486 |
| 2006/0278574 A1 | | 12/2006 | Khan et al. |
| 2007/0039300 A1 | * | 2/2007 | Kahlbaugh et al. ............. 55/527 |

FOREIGN PATENT DOCUMENTS

| | | | |
|---|---|---|---|
| EP | 0428400 | | 6/1995 |
| EP | 0682557 | | 4/1997 |
| EP | 0616831 | | 6/1999 |
| EP | 0960645 | | 2/2000 |
| EP | 1270771 | | 1/2003 |
| EP | 1198280 | | 6/2003 |
| EP | 1173269 | | 7/2003 |
| EP | 1050331 | | 12/2003 |
| EP | 1133342 | | 1/2004 |
| EP | 01048335 | | 4/2005 |
| GB | 02015253 | | 9/1979 |
| GB | 2195558 A | * | 9/1987 |
| GB | 02194255 | | 3/1988 |
| GB | 2195558 A | * | 4/1988 |
| JP | 11-036169 | | 2/1999 |
| PL | 172113 | | 4/1995 |
| PL | 186112 | | 9/1999 |
| WO | WO-95/13856 | | 5/1995 |
| WO | WO 95/13856 | * | 5/1995 |
| WO | WO-97/39817 | | 10/1997 |
| WO | WO-00/29656 | | 5/2000 |
| WO | WO-01/42549 | | 6/2001 |
| WO | WO-02/20133 | | 3/2002 |
| WO | WO-02/20668 | | 3/2002 |
| WO | WO-2004/110592 | | 12/2004 |

OTHER PUBLICATIONS

Tadeusz Jaroszczyk et al., "*Chapter 10 Cartridge Filtration*", in Filtration Principles and Practices, Second Edition, Revised and Expanded, Michael Matteson and Clyde Orr, eds., Marcel Dekker, Inc., New York, 1987, p. 547.

L. Spielman et al., "*Progress in Induced Coalescence and a New theoretical Framework for Coalescence by Porous Media*", Flow through Porous Media, R. Nunge, Chairman, ACS Publications, Washington, D.C., 1970.

L. Spielman et al., "*Theory of Coalescence by Flow through Porous Media*", Ind. Eng. Chem. Fundamentals, 11:66-72, 1972a.

L. Spielman et al., "*Experiments in Coalescence by Flow through Fibrous Mats*", Ind. Eng. Chem. Fundamentals, 11:73-83, 1972b.

L. Spielman et al., "*Coalescence in Oil-in-Water Suspensions by Flow Through Porous Media*", Ind. Eng. Chem. Fundamentals, 16:272-282, 1977.

U.S. Appl. No. 60/625,439, filed Nov. 5, 2004, by Inventor Keh B. Dema.

U.S. Appl. No. 60/650,051, filed Feb. 4, 2005, by Inventor Robert M. Rogers.

* cited by examiner

SPACE OPTIMIZED COALESCER

CROSS-REFERENCE TO RELATED APPLICATIONS

This application is a continuation-in-part of U.S. patent application Ser. No. 11/273,101, filed Nov. 14, 2005, and a continuation-in-part of U.S. patent application Ser. No. 11/230,694, filed Sep. 20, 2005.

BACKGROUND AND SUMMARY

The invention relates to coalescers.

Coalescers are known in the prior art for coalescing a medium having two immiscible phases, namely a continuous phase and a dispersed phase. For example: in engine crankcase ventilation systems, and other air-oil separation systems, the continuous phase is air, and the dispersed phase is oil; in fuel-water separation systems, such as fuel filters, fuel is the continuous phase, and water is the dispersed phase; in water-oil separation systems, water is the continuous phase, and oil is the dispersed phase. The coalescer element has coalescer media capturing droplets of the dispersed phase, coalescingly growing the droplets into larger drops which further coalesce and grow to form pools that drain. The invention is particularly well suited for engine crankcase ventilation applications, but may be used in other separation systems having immiscible fluids, e.g. air-oil, fuel-water, water-oil, etc.

In designing a coalescer, trade-offs often need to be made. For example, a) high removal efficiency or b) low pressure drop or c) long service life or d) small size can be achieved individually, but not necessarily in combination. The present invention addresses and reduces these trade-offs in combination.

BRIEF DESCRIPTION OF THE DRAWINGS

FIG. 1 schematically illustrates coalescence.

FIG. 2 is a graph showing loading and saturation.

FIG. 3 is a perspective view of a coalescer in accordance with the '694 application.

FIG. 4 is a front elevation view of the coalescer of FIG. 3, and shows a further embodiment in accordance with the '694 application.

FIG. 5 is like FIG. 4 and shows another embodiment.
FIG. 6 is like FIG. 4 and shows another embodiment.
FIG. 7 is like FIG. 4 and shows another embodiment.
FIG. 8 is like FIG. 4 and shows another embodiment.
FIG. 9 is like FIG. 4 and shows another embodiment.
FIG. 10 is like FIG. 4 and shows a further embodiment.
FIG. 11 is a schematic illustration showing fiber orientation angle.
FIG. 12 is like FIG. 11 and shows another embodiment.
FIG. 13 is like FIG. 11 and shows another embodiment.
FIG. 14 is like FIG. 11 and shows another embodiment.
FIG. 15 is like FIG. 11 and shows another embodiment.
FIG. 16 is like FIG. 11 and shows another embodiment.
FIG. 17 is like FIG. 11 and shows another embodiment.
FIG. 18 is like FIG. 11 and shows another embodiment.
FIG. 19 is like FIG. 11 and shows another embodiment.
FIG. 20 is like FIG. 11 and shows another embodiment.
FIG. 21 is like FIG. 11 and shows another embodiment.
FIG. 22 is like FIG. 11 and shows another embodiment.
FIG. 23 is a microphotograph of fibrous media taken with a scanning electron microscope at 43× magnification.
FIG. 24 is a microphotograph of fibrous media taken with a scanning electron microscope at 35× magnification, at a 90° orientation relative to FIG. 23.
FIG. 25 is a schematic illustration of a further embodiment showing fiber orientation across a localized pocket.
FIG. 26 is a schematic perspective view illustrating a method for making a coalescer in accordance with the '101 application.
FIG. 27 is like FIG. 26 and shows a further embodiment.
FIG. 28 is a graph illustrating coalescer characteristics in accordance with the '101 application.

DETAILED DESCRIPTION

U.S. patent application Ser. No. 11/230,694

The following description regarding FIGS. 1-25 is taken from the noted '694 application.

Figure 1:
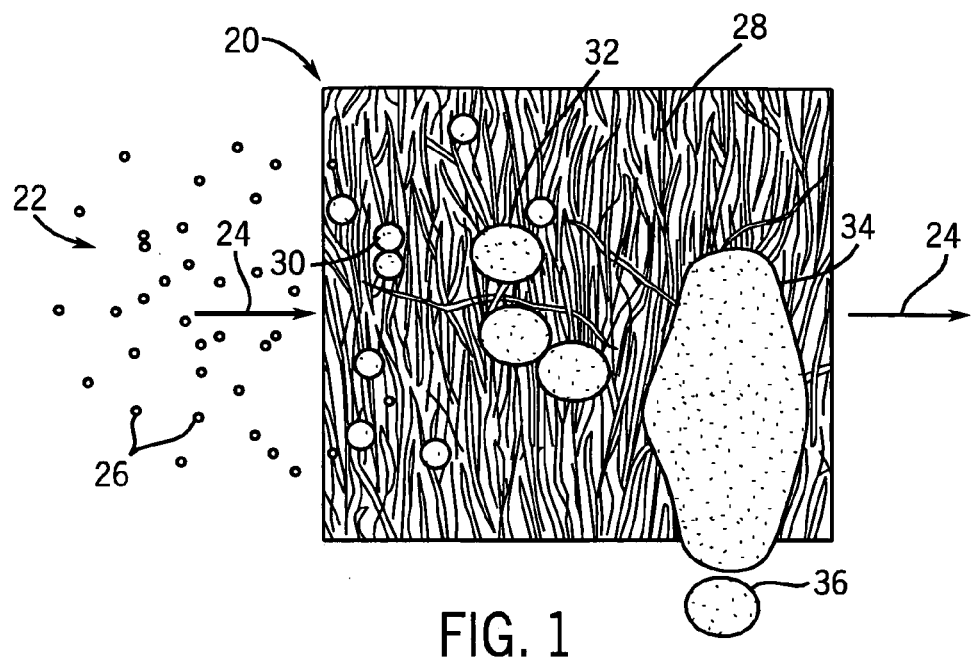
FIGS. 1-25 are taken from the above noted parent '694 application.

FIG. 1 shows a coalescer 20 for coalescing a medium 22 having two immiscible phases, namely a continuous phase 24 and a dispersed phase 26. For example, in the case of an engine crankcase ventilation coalescer, the continuous phase 24 is air, and the dispersed phase is oil, e.g. in the form of a fine mist having droplets 26 of about one micron and smaller in diameter. The continuous phase 24 flows from upstream to downstream, i.e. left to right in FIG. 1. The coalescer includes fibrous media 28 capturing droplets of the dispersed phase, coalescingly growing the droplets into larger drops, for example as shown at 30, 32, which further coalesce and grow to form pools such as 34 which drain as shown at 36. Within the gas or air stream 24, droplets 26 can collide and grow in size by drop to drop coalescence. Upon entry into coalescer 20, the droplets are captured by impaction, interception, diffusion, or electrostatic or other filtration mechanisms. Droplets grow in size as captured and uncaptured droplets coalesce to form larger drops. When the drops become large enough and pool at 34 such that flow and/or gravitational forces exceed adhesion forces, the enlarged/pooled drops flow through the bed of fibrous media and are released as shown at 36. Dispersed phase saturation varies within the coalescer, typically with increasing saturation as one approaches the downstream face (right hand face FIG. 1), due to viscous forces, and with increasing saturation at the bottom of the coalescer due to gravity. Saturation, like porosity, is a dimensionless number representing the fraction or percent of a filter media's void space that is occupied by the captured dispersed phase. Saturation does not mean that the entire void volume is filled with the captured dispersed phase such as oil, but rather that the element is holding as much oil as it can. At saturation, more oil is held at the bottom and right than at the top and left in FIG. 1.

Figure 2:
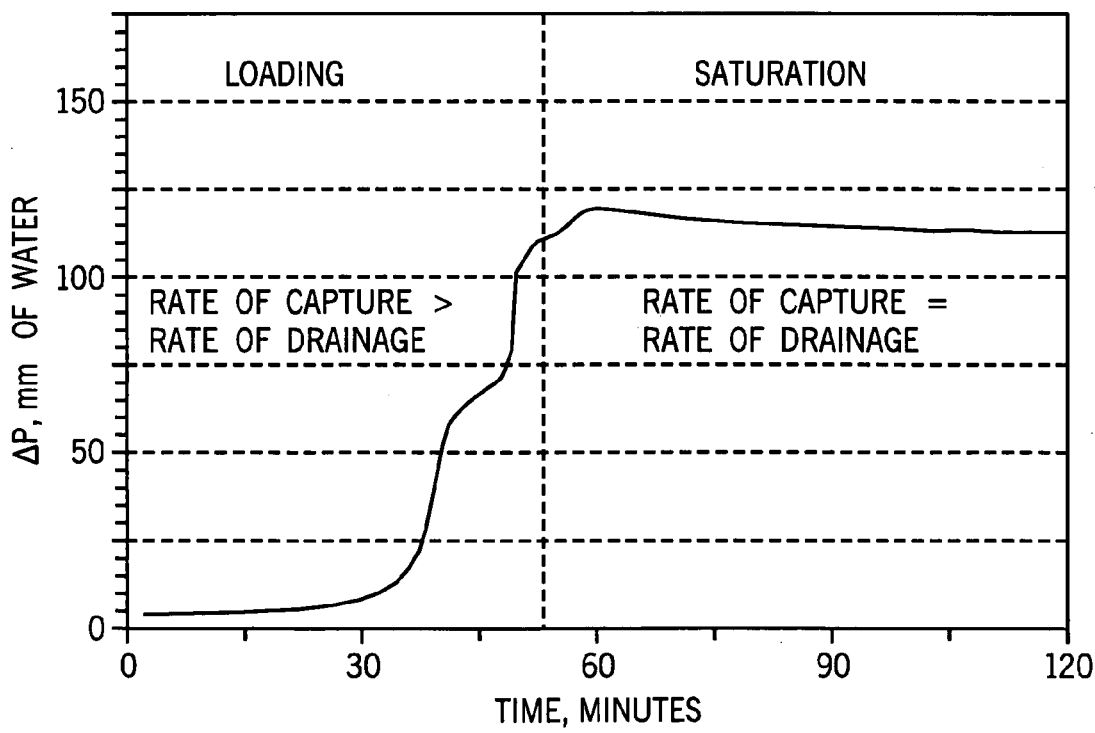

In the absence of solid contaminants, the pressure drop across a coalescer increases during the loading of the coalescer, left side of FIG. 2, and then stabilizes once the coalescer becomes saturated, right side of FIG. 2. FIG. 2 is a graphical plot of pressure drop, ΔP, in millimeters of water, verses time in minutes. During loading, the rate of capture is greater than the rate of drainage. During saturation, the rate of capture equals the rate of drainage. In practice, plugging or excessively high pressure occurs due to solid contaminants being captured and held by the coalescer and/or the rate of capture exceeding the rate of drainage from the coalescer. In two of the desirable aspects of the present disclosure, the solids holding capacity of the coalescer is increased and the rate of drainage of the coalescer is increased. The noted saturation profile is important in coalescer design because increased saturation corresponds to decreasing effective porosity within the fibrous media bed and increasing restriction.

The disclosure of the '694 application provides a coalescer with fibrous media adapted to reduce pressure drop thereacross by increasing drainage therefrom. This is accomplished in various ways, to be described.

Figure 3:
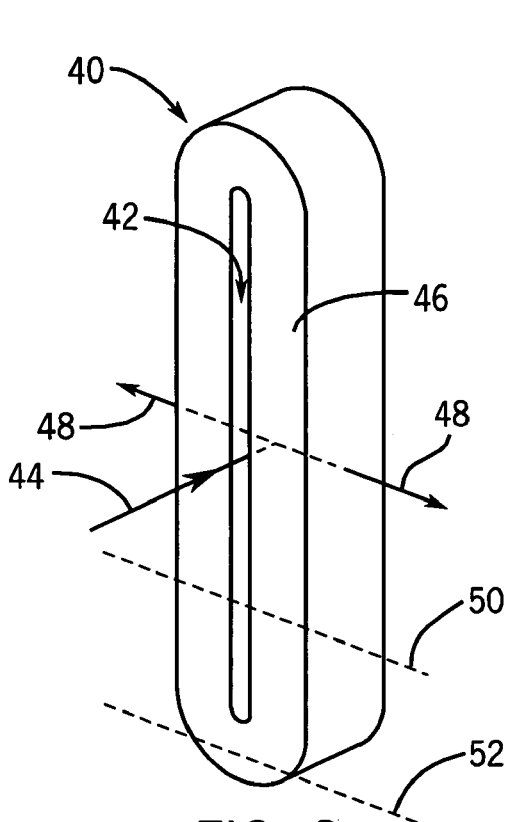
Figure 4:
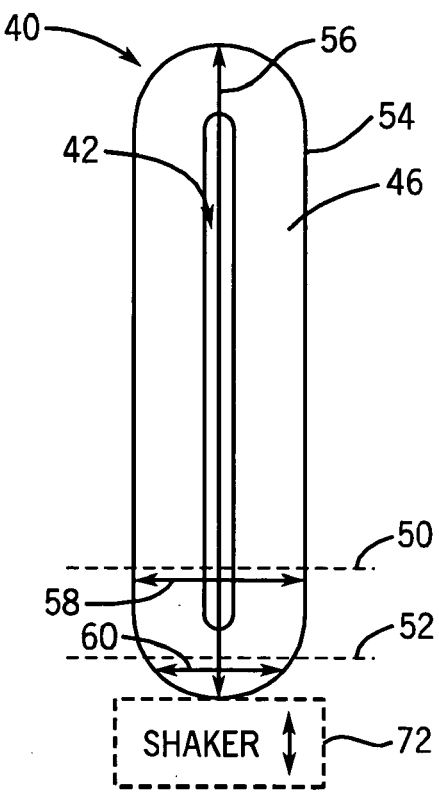
Figure 5:
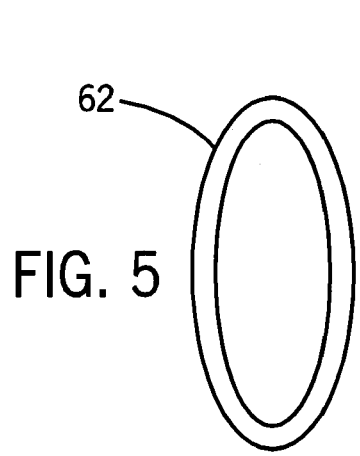
Figure 6:
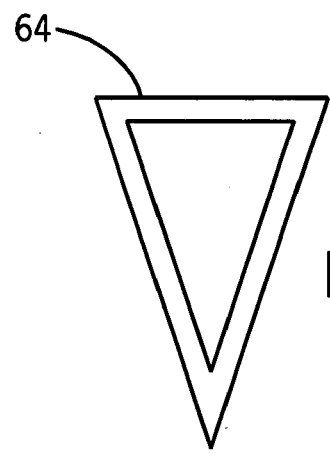
Figure 7:
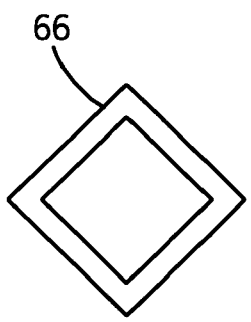
Figure 8:
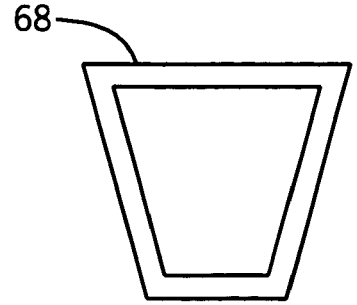
Figure 9:
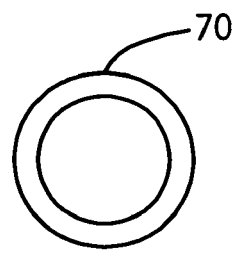
Figure 10:
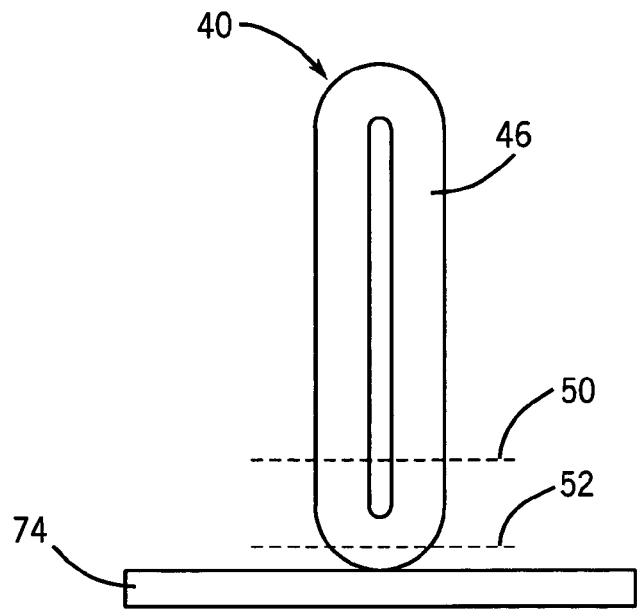

FIG. 3 shows a fibrous media coalescer 40 having a hollow interior 42 and providing inside-out flow, namely incoming flow as shown at 44 into hollow interior 42, and then flow from hollow interior 42 outwardly through fibrous media 46 as shown at arrows 48. Coalescer 40 has a first cross-sectional area $A_1$ along a first horizontal plane 50, and a second cross-sectional area $A_2$ along a second horizontal plane 52. Horizontal plane 52, FIGS. 3, 4, is vertically below horizontal plane 50. Cross-sectional area $A_2$ is less than cross-sectional area Al. Coalescer 40 has a perimeter 54 having a plurality of chords thereacross, including vertical chords such as 56 and horizontal chords such as 58. The longest of the chords, e.g. 56, extends vertically. The horizontal chords include a first horizontal chord, e.g. 58, along horizontal plane 50, and a second horizontal chord 60 along horizontal plane 52. Horizontal chord 60 is shorter than horizontal chord 58. The drainage pressure on the dispersed phase coalesced drops at the bottom of the coalescer, and hence the drainage rate at such point, is a function of the height of the dispersed phase column, which is proportional to the element height and cross-sectional area. By providing the long dimension of the shape along a vertical orientation, drainage pressure is maximized. By having the cross-sectional area decrease towards the bottom of the coalescer, two benefits are obtained. Firstly, the volume of the element that is dispersed phase saturated is minimized, where restriction is greatest and contaminated fluid flow rate and removal are least. Conversely, the volume of the element is maximized where restriction is least and contaminated fluid flow rate and removal greatest. Secondly, a greater proportion of element volume is available to capture and hold any solids that may plug the coalescer or otherwise cause excessive pressure drop. The lower section is more restrictive and has a lower flow rate than the upper section, due to increased local saturation relative to the upper section. One would expect removal to also be higher in the lower section, however this is not the case because: (a) since less flow goes through the lower section, its contribution to total removal by the element is less; and (b) the local velocity in the lower section is relatively high, which in conjunction with the increased saturation, increases re-entrainment of drops, which adversely affects removal.

FIGS. 3, 4, show the noted given shape in the vertical plane as a hollow racetrack shape. Other given shapes in the vertical plane are possible, for example a hollow oval shape 62, FIG. 5, a hollow triangle shape 64, FIG. 6, a hollow square shape 66, FIG. 7, a hollow trapezoid shape 68, FIG. 8, and a hollow circle shape 70, FIG. 9. Inside-out flow is preferred because flow velocity decreases with distance into the media, which minimizes possible re-entrainment and carryover of coalesced drops into the clean side and reduces the velocity in the portion of the coalescer where saturation is high. This is a particular advantage for racetrack and oval shapes because of their better space utilization due to the smaller upstream open hollow space in the interior of elements of these shapes. Outside-in flow is also possible.

In one embodiment, the fibrous media is provided by a plurality of fibers having a nonrandom dominantly vertical orientation, FIG. 4. The fibers are preferably polymeric and preferentially oriented around the periphery of the given shape and where possible parallel to the direction of gravity. The fibers preferably extend dominantly circumferentially tangentially along perimeter 54. The fibers preferentially extending dominantly circumferentially tangentially along perimeter 54 are dominantly vertical and provide increasing drainage pressure at lower regions of the coalescer. The elements are preferably made by electro-spinning or melt-blowing the fibers or wrapping or winding sheets of fibrous media around the element periphery giving the fibers the noted preferred orientation. The preferred orientation and alignment of the fibers reduces the resistance of captured drops to flow and enhances drainage by forming flow paths and channels parallel to gravity. For ease of manufacturability, polymeric fibers formed by melt-blowing or electro-spinning are preferred, but other materials may also be used.

In a further embodiment, FIG. 4, vibration or oscillation of the coalescer in a vertical direction, particularly in combination with the above noted fiber orientation, is a further way to enhance drainage, minimize restriction, and increase coalescer life. A shaker 72 as shown in dashed line, which in one embodiment may be an internal combustion engine or other mechanical component, vibrates or oscillates the coalescer in a vertical direction. This movement or vibration in the vertical direction accelerates the captured drops, and the sudden reversal in direction causes them to shear from the fibers and drain with minimum resistance. In the noted implementation, the normal vibration of an engine or other equipment facilitates such vibration, however it may be desirable to provide judicious positioning and mounting of the coalescer or by the addition of a mechanical vibrator for vibrating the coalescer.

The coalescer has a lower region, e.g. at plane 52, FIG. 4, of greater dispersed phase saturation and smaller volume than an upper region, e.g. at plane 50, to minimize the volume of fibrous media that is saturated with the dispersed phase where restriction is greatest and continuous phase flow rate least and contaminant removal least, and to maximize the volume of the fibrous media where restriction is least and continuous phase flow rate greatest and contaminant removal greatest. In a further embodiment, FIG. 10, a lower media element 74 is provided of greater dispersed phase wettability than fibrous media 46 and in contact with the lower region of coalescer 40 and wicking coalesced drops from fibrous media 46 at the lower region. In one embodiment, fibrous media 46 is non-wetting with respect to the dispersed phase, and lower media element 74 is wetting with respect to the dispersed phase. In preferred form, the cosine of the dispersed phase contact angle of lower media element 74 is greater than the cosine of the dispersed phase contact angle of fibrous media 46. In the above noted internal combustion engine application, the purpose of wicking layer 74 is to draw oil from the coalescer and direct it to a collection vessel, such as the engine or a sump. In the preferred form of such embodiment, wicking layer 74 is a non-woven filter media, though alternatively it could be the walls of the sump itself or other material with suitable wettability characteristics.

The above disclosure provides various means for reducing pressure drop across the coalescer, including enhancing drainage of the coalesced dispersed phase from the coalescer. As shown in FIG. 2, the pressure drop across the coalescer increases with time until the rate of drainage of the coalesced dispersed phase (e.g. oil in the case of crankcase ventilation filters) equals the rate of dispersed phase capture. The equilibrium pressure drop can be reduced by increasing the drainage rate, which in turn reduces the dispersed phase saturation of the coalescer and increases the coalescer's effective porosity. By increasing the porosity, the solids loading capacity of the coalescer is increased, as is coalescer life.

Figure 11:
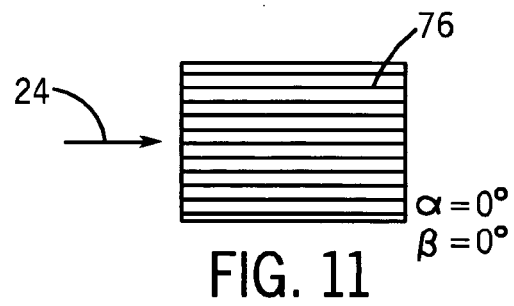
Figure 12:
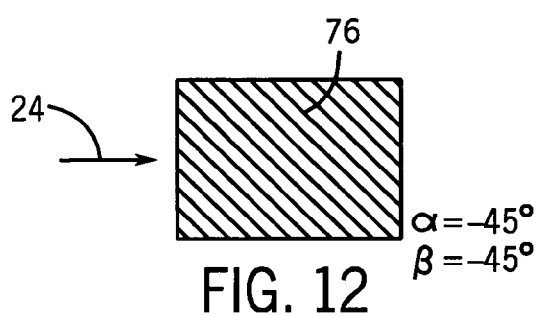
Figure 13:
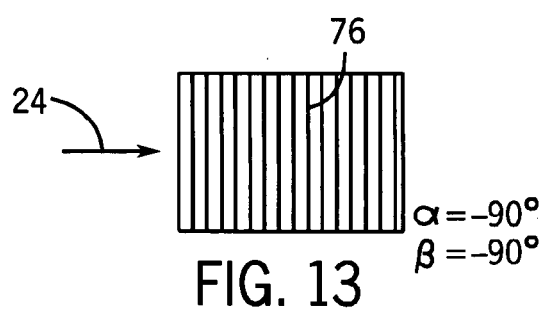
Figure 14:
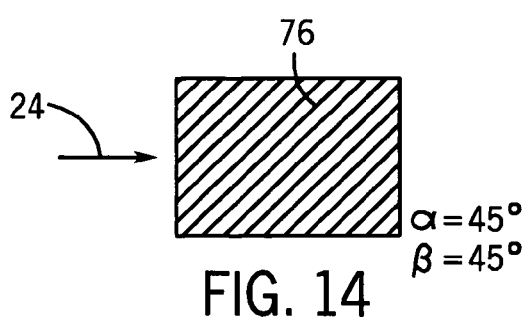
Figure 15:
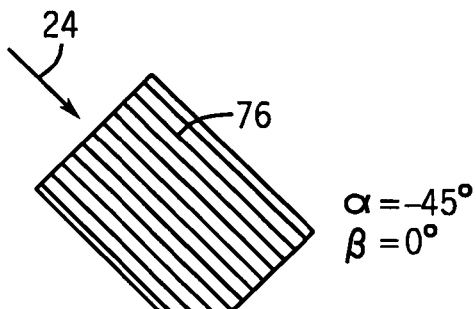
Figure 16:
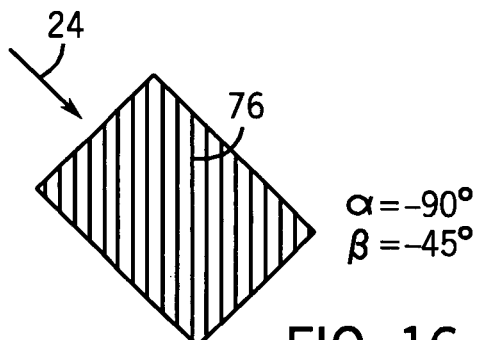
Figure 17:
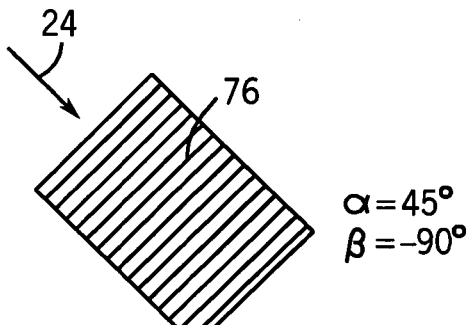
Figure 18:
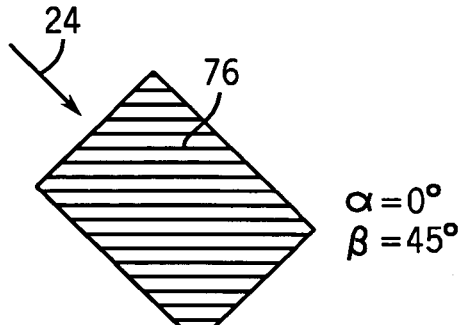
Figure 19:
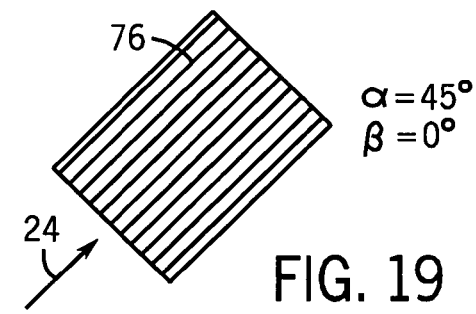
Figure 20:
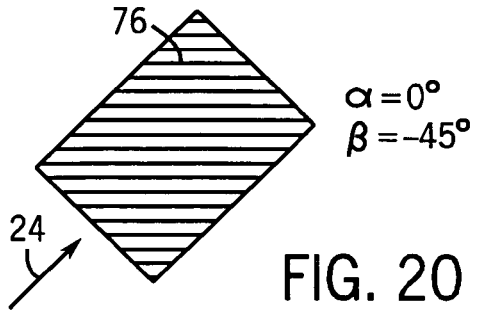
Figure 21:
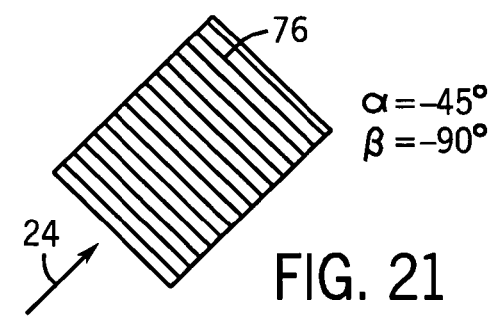
Figure 22:
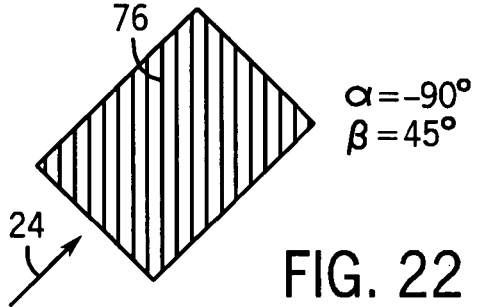

Further to the above disclosed manner for increasing drainage rate, various ways are available for taking further advantage of fiber orientation. Fibers may be beneficially oriented with respect to gravity and with respect to one another, as above noted. For purposes herein, a first dominant fiber orientation angle $\alpha$ is defined as the angle of fiber extension 76, FIGS. 11-22, relative to horizontal, i.e. relative to a direction which is perpendicular to gravity. In FIGS. 11, 18, 20, $\alpha$ is 0°. In FIGS. 12, 15, 21, $\alpha$ is minus 45°. In FIGS. 13, 16, 22, $\alpha$ is minus 90°. In FIGS. 14, 17, 19, $\alpha$ is 45°. Fibers may also be beneficially oriented with respect to the direction of flow. For purposes herein, a second dominant fiber orientation angle $\beta$ is defined as the angle of fiber extension 76 relative to flow direction 24. In FIGS. 11, 15, 19, $\beta$ is 0°. In FIGS. 12, 16, 20, $\beta$ is minus 45. In FIGS. 13, 17, 21, $\beta$ is minus 90°. In FIGS. 14, 18, 22, $\beta$ is 45°. FIGS. 11-22 show various exemplary flow directions among the plurality of flow directions from hollow interior 42 outwardly through fibrous media 46. FIGS. 11-14 show a flow direction 24 parallel to horizontal. FIGS. 15-18 show a flow direction 24 at minus 45° relative to horizontal. FIGS. 19-22 show a flow direction 24 at 45° relative to horizontal.

Three forces act on captured and coalesced drops, namely: drag forces due to fluid flow; gravity; and adhesion or attachment forces due to capillary pressure. The third force is controlled by the wetting characteristics of the media and is noted above. Also of significance is the interplay between drag and gravity forces. Since it is desired to drain drops downwardly, it is desired that fiber orientation angle $\alpha$ satisfy the condition that sine $\alpha$ is less than zero, so that gravity assists drainage, for example FIGS. 12, 13. If sine $\alpha$ is greater than zero, gravity hinders drainage, increasing the equilibrium pressure drop, and reducing life. Accordingly, the fiber orientation angles $\alpha$ in FIGS. 11 and 14 are less desirable. It is preferred that $\alpha$ be less than 0° and greater than or equal to minus 90°. As to fiber orientation angle $\beta$ relative to flow direction 24, drag forces due to fluid flow decrease as cosine $\beta$ increases. It is preferred that cosine $\beta$ be greater than 0.5, i.e. that $\beta$ be less than 60° and greater than minus 60°.

Figure 23:
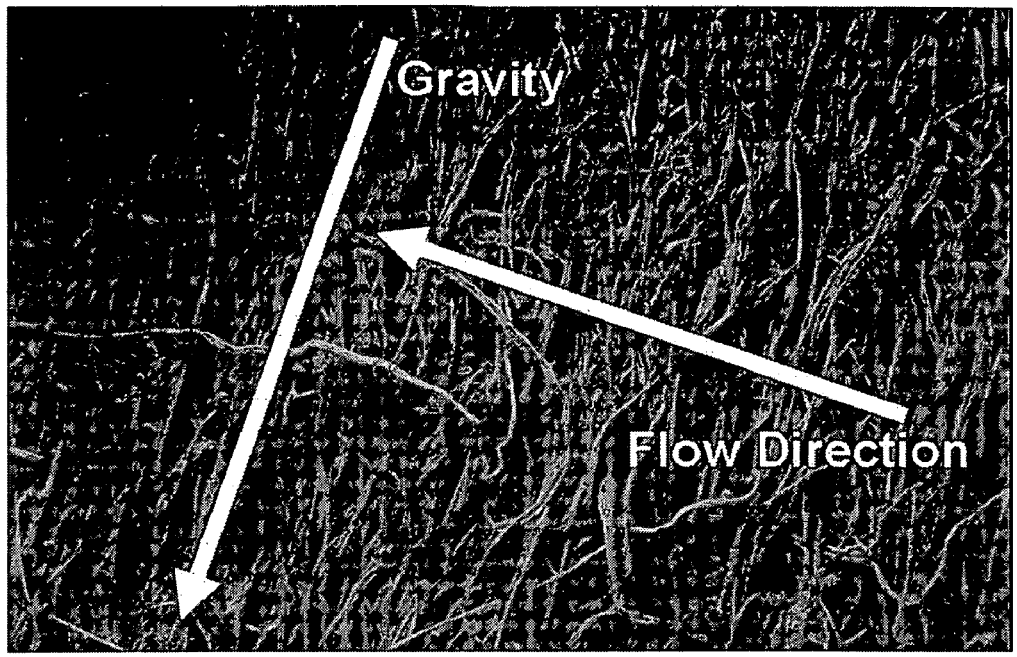
Figure 24:
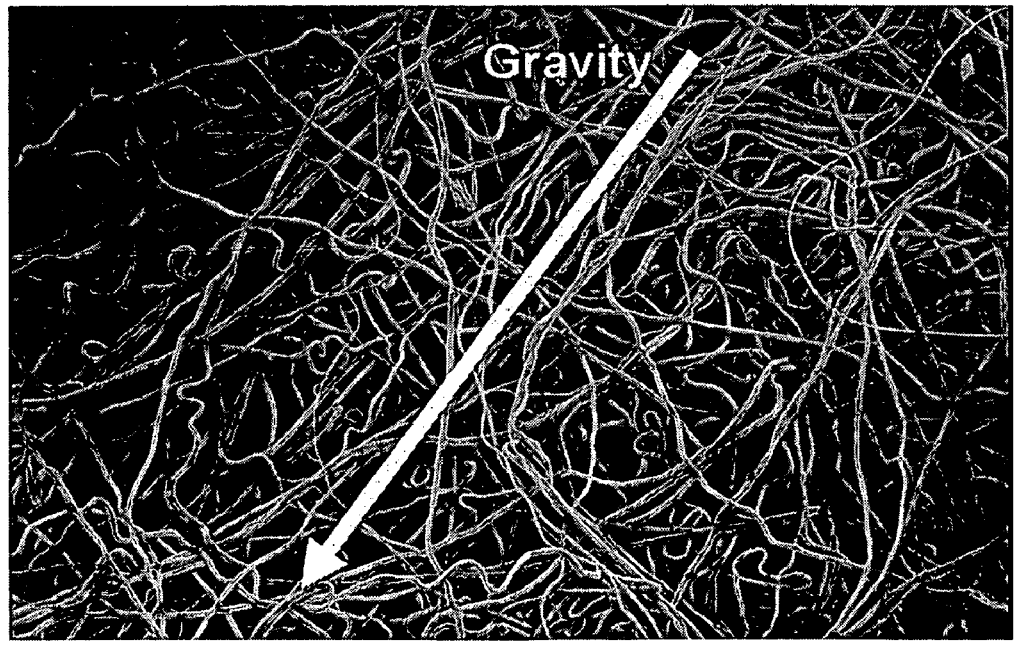
Figure 25:
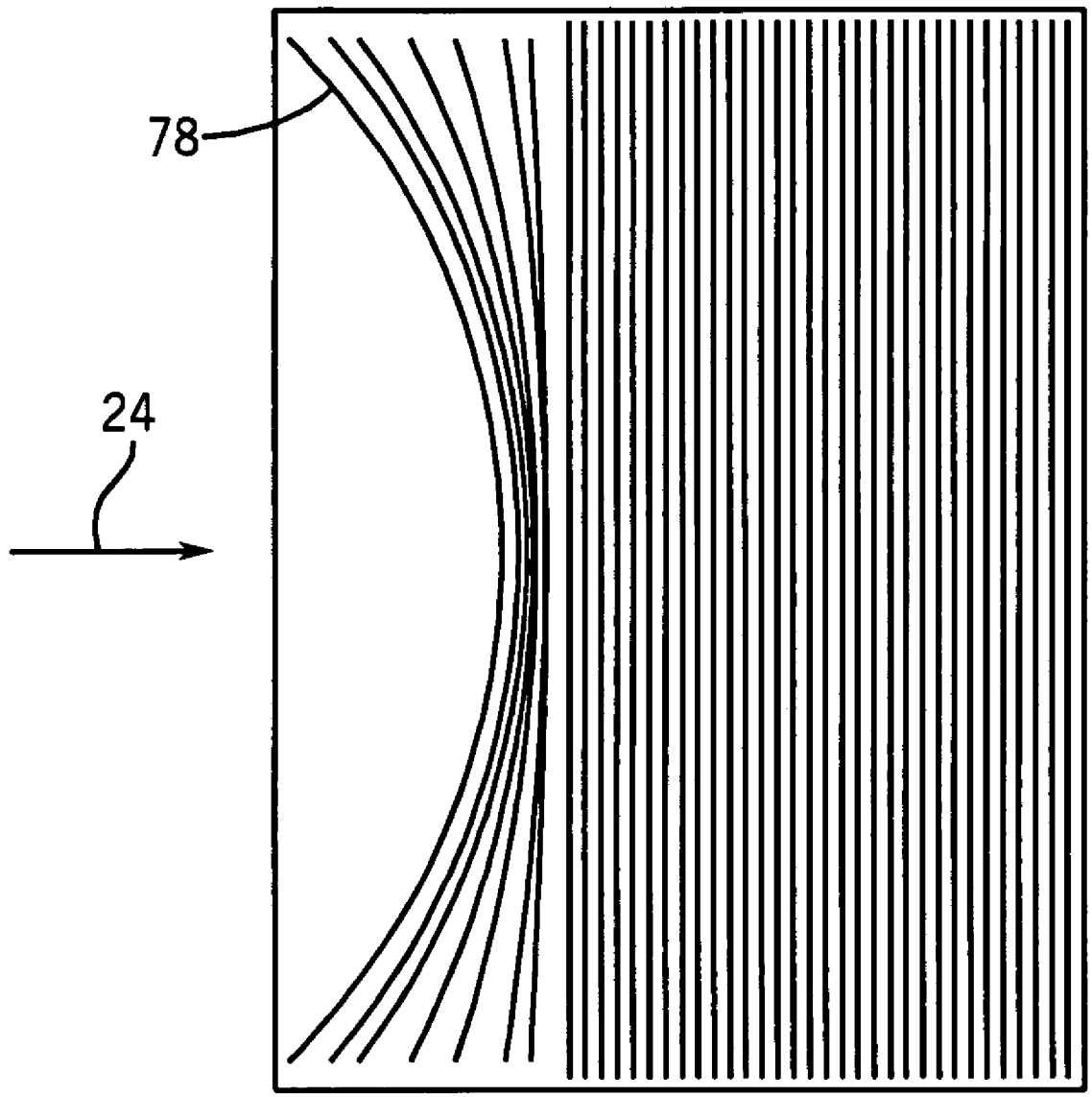

In order to decrease overall saturation of the coalescer, reduce pressure drop, and increase life, it is not necessary for all fibers to exhibit the preferred orientation. Rather, most of the fibers should have the desired orientation, i.e. have a dominant fiber orientation or angle. FIG. 23 is a microphotograph showing dominant fiber orientation generally parallel to gravity and perpendicular to flow direction, as shown by the indicated arrows. FIG. 24 is a microphotograph showing fiber orientation relative to gravity, wherein the direction of flow is into the page. In further embodiments, sufficient numbers of fibers may be provided having the desired orientation to enhance drainage locally. Because the coalesced dispersed phase drains more freely from such areas, the low local dispersed phase saturation and pressure drop are maintained, and the net effective saturation of the coalescer is reduced. While it is desirable for all fibers to exhibit $\alpha$ less than 0° and greater than or equal to minus 90° and $\beta$ less than 60° and greater than minus 60°, this may not be feasible. Various combinations may also be employed. For example, in FIG. 25 if localized regions of different fiber orientation are desired other than perpendicular, localized pockets such as shown at 78 may be formed in the fibrous media, such pockets deflecting a plurality of fibers along other fiber orientation angles $\alpha$ and $\beta$. These localized pockets may be provided as shown in U.S. Pat. No. 6,387,144, incorporated herein by reference, for example by needle punching to create such localized pockets, depressions, or indentations with fiber orientation angles $\alpha$ and $\beta$ different than 0° and other than 90° or minus 90°. Other means may also be used for forming the localized pockets, for example the media may be spiked with larger fibers, wires, nails, brads, or similar structures having a high length to width aspect ratio oriented such that $\alpha$ and/or $\beta$ is other than 90° or minus 90° as desired. In another alternative, a thread-like material may be sewed into the coalescer media using a sewing machine or the like, with the threads being oriented along an angle of 0° (parallel to flow direction), and the puncturing needle and thread would cause the surrounding media fibers to orient at angles other than 90° or minus 90°. In another alternative, rather than needle punching, the localized pockets could be created using a heated needle or an ultrasonic welding type process. This will create a saturation gradient causing the coalesced dispersed phase to drain from the coalescer. Hence, even though all fibers do not have a desired orientation angle a other than 0°, drainage will nonetheless be enhanced compared to having all fibers oriented with a equal to 0°. These refinements introduce fibers or structures preferentially oriented with respect to flow in a manner that assists drainage and reduces pressure drop. Since it is often impractical to have all fibers so oriented, localized pockets having the preferred orientation can be created in layered media to reduce pressure drop and improve coalescer life.

The system of the '694 application provides a method of increasing the life of a coalescer. The coalescer has a pressure drop thereacross increasing with time until the rate of drainage of the coalesced dispersed phase equals the rate of capture, providing an equilibrium pressure drop. The method increases coalescer life by reducing dispersed phase saturation and increasing porosity and solids loading capacity by decreasing equilibrium pressure drop by increasing the rate of drainage. The method involves providing fibrous media as a plurality of fibers and dominantly orienting the fibers preferably along a first dominant fiber orientation angle $\alpha$ less than 0° and greater than or equal to minus 90° and preferably along a second dominant fiber orientation angle p less than 60° and greater than minus 60°. In one embodiment, the coalescer is vertically vibrated. The method involves minimizing the volume of fibrous media that is saturated with the dispersed phase where restriction is greatest and flow rate and removal least, and maximizing the volume of the fibrous media where restriction is least and flow rate and removal greatest, by providing the coalescer with a lower region of greater dispersed phase saturation and smaller volume than an upper region. In one embodiment, the coalesced drops are wicked away from the fibrous media at the lower region of increased dispersed phase saturation.

U.S. patent application Ser. No. 11/273,101

Figure 26:
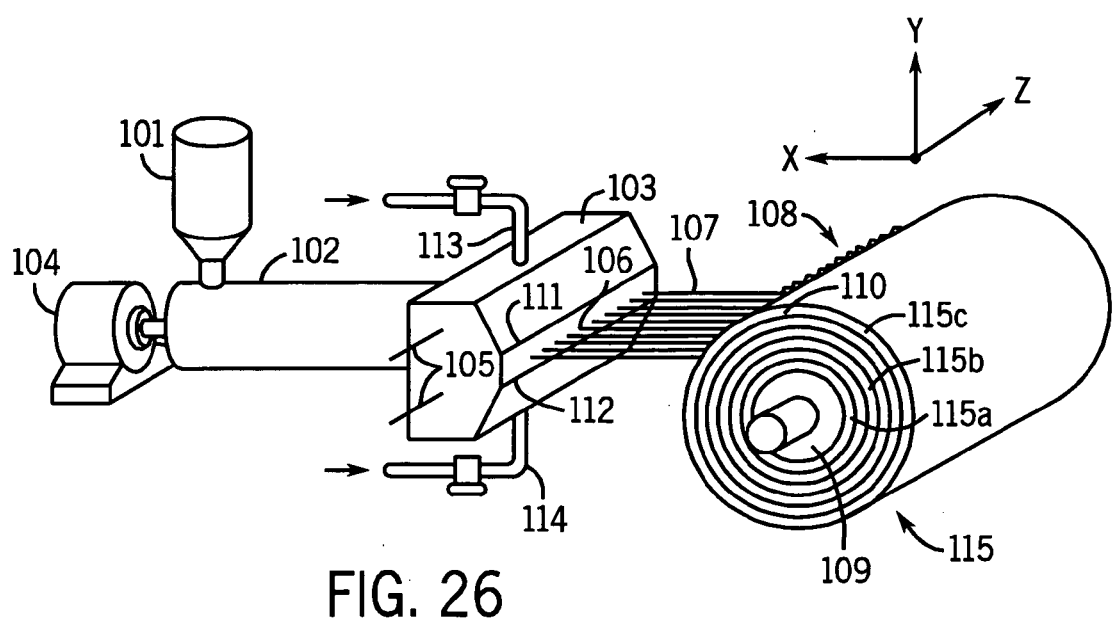
FIGS. 26-28 are taken from the noted parent '101 application.
Figure 27:
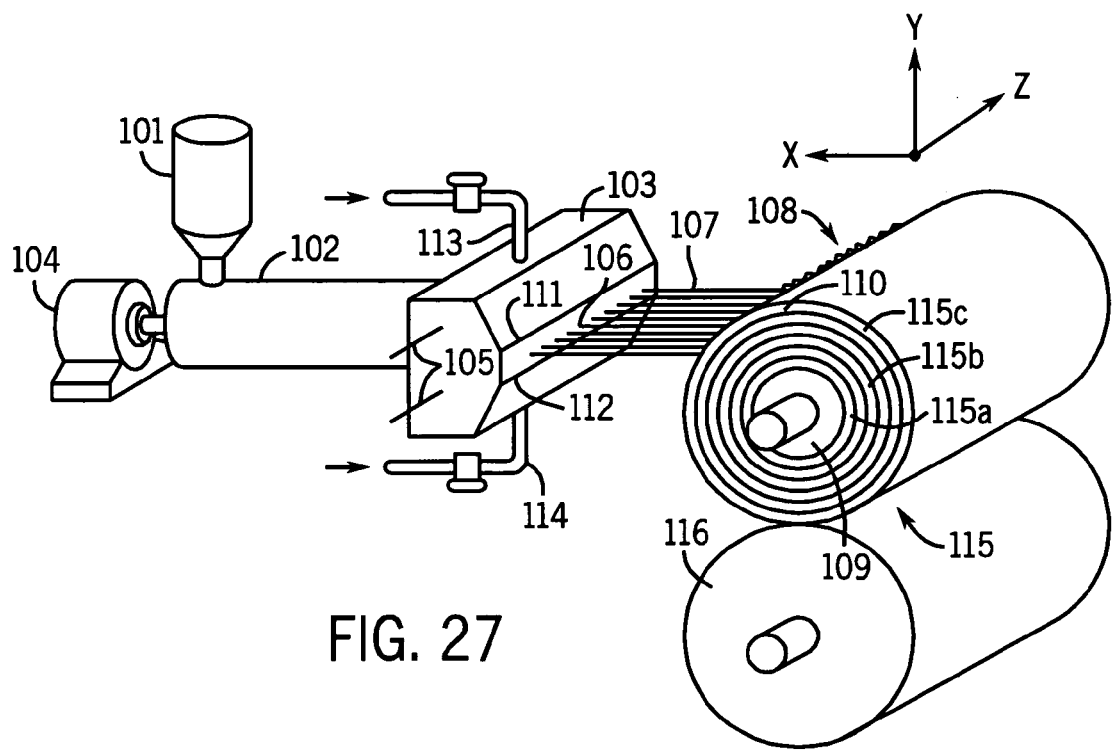
Figure 28:
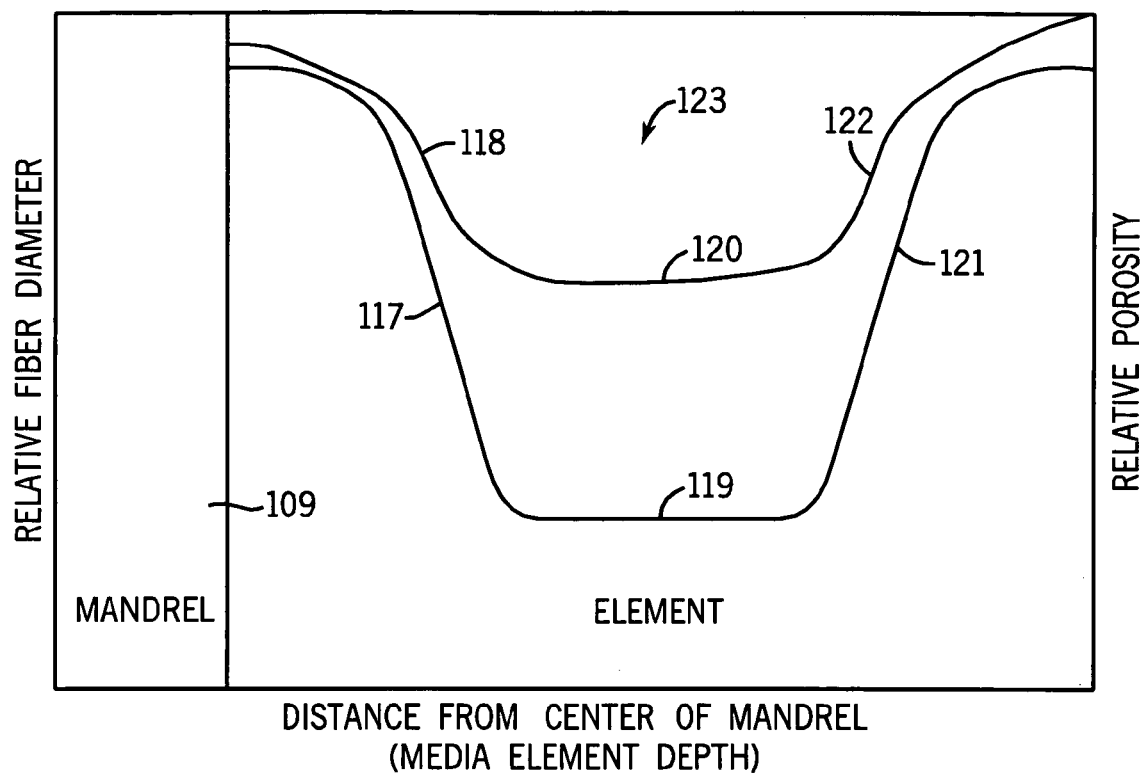
Figure 29:
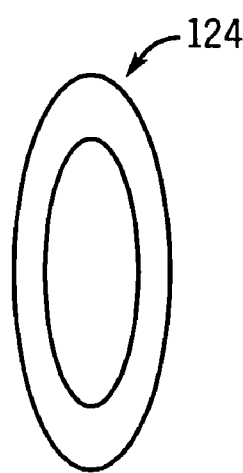
FIG. 29 is a section view showing a coalescer in accordance with the present invention.
Figure 30:
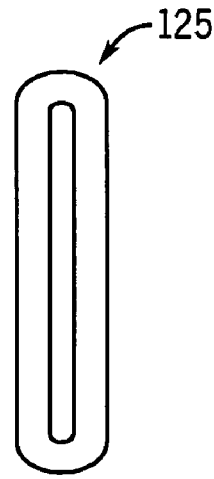
FIG. 30 is like FIG. 29 and shows another embodiment.
Figure 31:
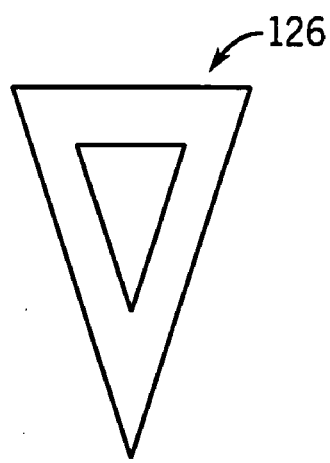
FIG. 31 is like FIG. 29 and shows another embodiment.
Figure 32:
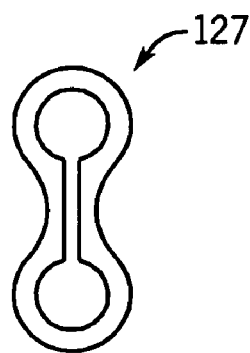
FIG. 32 is like FIG. 29 and shows another embodiment.
Figure 33:
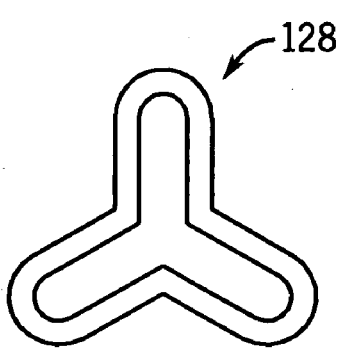
FIG. 33 is like FIG. 29 and shows another embodiment.
Figure 34:
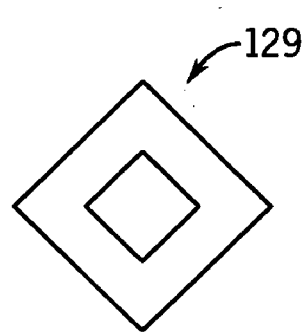
FIG. 34 is like FIG. 29 and shows another embodiment.
Figure 35:
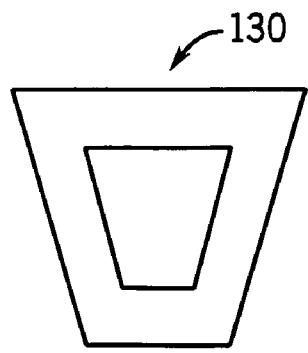
FIG. 35 is like FIG. 29 and shows another embodiment.

The following disclosure regarding FIGS. 26-28 is taken from the noted '101 application.

In the preferred embodiment, the system of the '101 application uses melt blowing techniques for making a coalescer. Melt blowing techniques for particulate filters are known in the prior art, for example U.S. Pat. Nos. 6,860,917, 3,755, 527, incorporated herein by reference. Referring to FIG. 26, and also noting the description in incorporated U.S. Pat. No. 6,860,917, Col. 3, lines 25+, pellets of thermoplastic polymer, for example polyester, polypropylene, polyetherester, polyamide, polyurethane, polyphenylene sulfide, nylon, ethylene acrylic copolymer, polystyrene, polymethylmethacrylate, polycarbonate, silicones, polyethyleneter-phthalate, or blends or mixtures of these, are introduced into a pellet hopper 101 of an extruder 102. The thermoplastic polymer is forced through the extruder 102 into a die head 103 by a drive or melt pump 104. The die head 103 may contain heating means 105 which may control the temperature in the die head 103. The thermoplastic polymer is then forced out of a row of die openings 106, also known as spinnerets, in the die head 103 into a gas stream which attenuates the thermoplastic polymer into fibers 107 which are collected on a moving collecting device 8 such as a rotating mandrel or drum 109 to form a continuous web 110. The gas stream which attenuates the thermoplastic polymer is supplied through gas jets 111 and 112, for which further reference may be had to FIG. 2 of above noted incorporated U.S. Pat. No. 3,755,527. The gas slots 111 and 112 are supplied with a hot gas, preferably air, by gas lines 113 and 114. Reference is also made to U.S. Pat. No. 3,978,185, incorporated herein by reference, for showing a melt blowing process. Melt blowing includes processes sometimes called melt spinning and spun bonding. Typically, melt blown filter cartridges are made by extruding a polymer through orifices associated with a melt blowing die to form fibers which are directed toward a collector. During melt blowing, a flow of inert gas (e.g. air) acts on the molten fibers so as to attenuate the fibers to relatively fine diameter and to randomly distribute the attenuated fibers onto the collector. A mass of non-woven, randomly intermingled solidified fibers builds up on the collector. Collector 108 provided by rotary mandrel 109 collects and rolls the fibers into an annular filter roll 115.

In one aspect, the '101 application provides a method for producing essentially continuous, long fibers of polymer with varying diameter by a melt blown process. The fibers are wound into a form of defined shape to produce the coalescer element with graded fiber diameter and porosity characteristics. The coalescer coalesces a medium having two immiscible phases, namely a continuous phase and a dispersed phase. The continuous phase flows from upstream to downstream. The coalescer element is provided by fibrous media capturing droplets of the dispersed phase, coaslescingly growing the droplets into larger drops which further coalesce and grow to form pools that drain. In one preferred embodiment, it is desirable for the coalescer media properties to vary as a function of depth. In coalescer applications such as crankcase ventilation coalescers, mist removal filters, fuel water coalescers, and oil water separators, it is desirable in one preferred embodiment for porosity and/or fiber diameter to decrease with increasing distance into the media, reaching a minimum at mid depth, i.e. somewhere between the upstream and downstream ends, and then for the porosity and/or fiber diameter to increase and become more open with further increasing distance into the media from mid depth to downstream, approaching the downstream face. This U-shaped profile is further described hereinafter, e.g. FIG. 28, providing decreasing fiber diameter and/or porosity from upstream to mid depth, and then increasing fiber diameter and/or porosity from mid depth to downstream. The decreasing porosity and fiber diameter results in lower restriction in the upstream portions of the coalescer. The minimum fiber diameter and/or porosity is where maximum removal efficiency is obtained. The subsequent increase in porosity and fiber diameter, proceeding from mid depth to downstream, facilitates drainage and release of captured droplets from the coalescer.

A variety of methods have been used to vary coalescer media properties as a function of depth. For example, different media layers can be stacked to obtain such effect. Coalescing filters, for example, are constructed of an inner, high efficiency coalescing layer, and an outer, coarser drainage layer. In some applications, multiple layers, e.g. perhaps as many as seven distinct layers, are used to achieve the noted benefits. Typically, this may be done by rolling or pleating different media sheets together in layers or by melt blowing, including melt spinning, different layers on top of one another. Each layer may consist of a different material to be obtained and handled in production. Each layer may require a different step and/or piece of equipment for handling and production. Transitions between layers tend to be abrupt or exhibit a step function change, which can result in corresponding discontinuities in fluid flow and may result in increased restriction and reduced life and capacity.

In one aspect of the '101 application, a method is provided for producing coalescer elements, including for crankcase ventilation and mist removal coalescers, and for other types of coalescers using fibrous coalescer media in which it may be desirable to vary fiber diameter and/or porosity as a function of depth into the coalescer. Fibers are created of essentially continuous length by melt blowing from a suitable thermoplastic polymer, for example those noted above. The fibers are collected onto a turning/spinning/rotating mandrel or other suitable collector of suitable cross-sectional shape, e.g. circular, oval, elliptical, racetrack, triangular, rectangular, diamond, trapezoidal, star-shaped and so on. In one aspect, the diameter of the individual fibers is varied as they are produced to create long fibers that have different diameters at different points along their length. In a further aspect, the diameter of the fibers is controlled as they are produced relative to the thickness of the coalescer media being formed on the mandrel in order to create a coalescer element with coalescer media properties, e.g. fiber diameter and/or porosity that vary as a function of depth. In another aspect, the collector, or mandrel, and the melt blowing die are moved relative to one another in a one, two or three dimensional manner.

FIG. 26 schematically illustrates the noted method. It shows a melt blowing process, including the noted hopper 101 containing the polymer pellets, the melt pump 104, the air lines 113, 114, the die 103, the mandrel 109, the fibers 107, and the formed coalescer element 115. Also illustrated is a three dimensional coordinate system having X, Y and Z axes orthogonal to each other, wherein the collector 108 provided by rotating mandrel 109 rotates about the Z axis and is spaced from die 103 along the X axis. The length of die 103 along the Z axis is typically less than that of element 115 in order to allow relative movement of die 103 and collector mandrel 109 during production of element 115 without significant overspray of the fiber 107. Fiber diameter along the length of the fiber is varied during production of the fiber by: varying the distance between the die and the collector/mandrel by moving the die and collector/mandrel relative to one another in the X and/or Y directions; and/or controlling the relative position of the die and the collector/mandrel to one another in the X, Y and Z directions; and/or controlling polymer throughput; and/or controlling air pressure and/or flow rate; and/or controlling mandrel speed, e.g. by moving the die and collector mandrel relative to one another in X, Y and/or Z directions and/or controlling mandrel rotation speed about the Z axis; and/or temperature of the polymer. These factors also affect the porosity and fiber orientation of the coalescer media. For example, by moving the relative positions of the die and collector back and forth in the Z direction, the orientation of fibers is reversed upon such change in direction of the collector or die. This creates a crossed pattern of interlocking fibers that increases the structural integrity of the resultant element, and facilitates drainage of coalesced liquid, for example as set forth in the above noted '694 application.

Porosity can also be controlled by applying pressure to the media. FIG. 27 is like FIG. 26 and uses like reference numerals from above where appropriate to facilitate understanding. A method of controlling porosity is provided through the use of a compression roller 116. By controlled use of compression roller 116 to apply pressure on coalescer element 115 and by controlling the pressure/force with which compression roller 116 rolls against element 115, porosity can be controlled during element production. Fiber diameter and/or porosity is controlled as a function of depth without using different layers of different media providing composite or laminate structures.

Fiber diameter is also a function of the types of thermoplastic polymer introduced into the hopper. This can be used to advantage to create higher performance coalescer elements. For example, by mixing pellets of two or more different types of compatible polymers, for example two polyesters with different melting points, in the hopper, and melt blowing the resultant mixture, fibers of two or more different diameters, chemical and physical characteristics can be simultaneously melt blown and laid down at the same location with respect to depth in the element. If for example, the two polymers have different melting points, one will cool faster than the other, and the one with the lowest melting point will bond strongly to the other type and increase the overall strength and structural integrity of the media, while creating a bi-modal fiber diameter distribution, with the fiber diameter of each mode varied during fiber production. Similarly, restriction and removal, for example, can be optimized by blending a small percentage of a polymer that yields large diameter fibers with a higher percentage of a polymer that yields finer fibers. Alternatively, the structural integrity of the element, for example, can be increased by blending a small percentage of a polymer that yields large diameter strong fibers with a higher percentage of a polymer that yields finer fibers better suited to capture fine contaminants but lacking in structural integrity. Drainage of coalesced liquid from a coalescer and reduced restriction may be obtained by blending a relatively highly wetting polymer with a relatively non-wetting polymer. To further optimize coalescer media structure, one could vary the relative amounts of the different types of fibers as a function of depth by controlling the relative amounts of the different polymers in the hopper or being pumped to the die. The combinations produce elements particularly well suited for coalescer applications, including crankcase ventilation filters, mist removal filters, fuel water coalescers, and oil water separators. Such elements coalesce and remove contaminant droplets from the fluid stream. They achieve high removal efficiency, to facilitate drainage of coalesced liquid contaminant, to have high contaminant holding capacity and long service life.

As an example, in a first coalescer embodiment, fibers having at least a bi-modal fiber diameter distribution are wound in a roll as a single sheet but effectively providing multiple layers in an element roll 115 achieving a porosity which varies as a function of depth. The average diameter for the smaller fibers in the fiber distribution is in the range of 0.05 to 10 µm, depending on the efficiency requirements. The function of these fibers is to remove fine contaminant with high efficiency. The coarser fibers have diameters from 20 to 100 µm to facilitate drainage. These elements are made as depth type elements with a minimum thickness of 10 mm. In order to make the elements physically robust and simultaneously generate fibers of two different diameters, two different types of polymers are used, e.g. 95% PBT (polybutylenetherephthalate) polymer and 5% PET (polyethyleneterephthalate) polymer is used. The average fiber density is 1.38 grams per cubic meter, and the average element porosity is greater than 80%. The use in combination of fine and coarse fibers, i.e. an individual fiber with differing diameters at different points along its length, results in high efficiency, good drainage properties, and low droplet re-entrainment. The removal efficiency for a new element is greater than 90% for ultra fine oil mist and soot while testing on a diesel engine in application to crankcase ventilation. The droplet size of oil mist ranges from less than 0.03 µm to 10 µm, while an average diameter is in the range of 0.4 to 1.0 µm. An efficiency of greater than 80% is obtained, even for the oil saturated stage of the coalescing process.

In a second coalescer embodiment example, the same polymer mixture is used to achieve a bi-modal distribution, however the distance between the die and collector mandrel is decreased at the beginning of coalescer element production (e.g. near the center 115a of an annular element 115 adjacent the mandrel), then gradually increased near the middle of element production, e.g. mid depth 115b for the media, and then decreased again near the end of the element production, e.g. at the outer portion 115c of the annular element. This is achieved by moving the die 103 and mandrel 109 relative to one another in the X direction. Simultaneously, the die 103 and mandrel 109 may be moved relative to one another in the Z direction to achieve a desired fiber orientation. This results in an element structure with coarser fibers of both types near filter face 115a to facilitate removal of coarser contaminants, but not finer contaminants, at the upstream side of the element when used in an inside-out flow geometry. Fiber diameter is at a maximum at regions 115a and 115c, and is at a minimum at region 115b. Fiber diameter decreases from region 115a to 115b, and then increases from region 115b to region 115c. Porosity is at a maximum at regions 115a and 115c, and is at a minimum at region 115b. Porosity decreases from region 115a to region 115b, and then increases from region 115b to region 115c. Fiber diameter and porosity vary as a function of distance outwardly from mandrel 109, i.e. vary as a function of filter depth from region 115a to region 115b and from region 115b to region 115c. This is illustrated in FIG. 28 showing distance from the center of the mandrel along the abscissa or horizontal axis, which is the radial depth of the element 115, and showing along the ordinate or vertical axis the relative fiber diameter and relative. porosity. The noted variance of fiber diameter and porosity decreasing from region 115a to 115b is shown at downward slopes 117, 118, and the fiber diameter and porosity at mid depth region 115b is shown at 119, 120, and the increasing fiber diameter and porosity from mid depth region 115b to downstream region 115c is shown at 121, 122, resulting in a U-shaped profile 123.

The noted U-shaped profile 123, FIG. 28, results in a net lowering of the total restriction across the coalescer element. The noted varying fiber diameter has a U-shaped profile 123 in a plot, FIG. 28, of element depth along the abscissa versus fiber diameter along the ordinate, with minimum fiber depth diameter at the bight 119 of the U at the noted mid depth 115b. Likewise, the noted varying porosity has a U-shaped profile in a plot of element depth along an abscissa versus porosity along an ordinate, with minimum porosity at the bight of the U at the noted mid depth 115b. Fiber diameter and porosity decrease from region 115a to region 115b where a minimum is achieved for both parameters at which point removal and restriction is highest. From this minimum, fiber diameter and porosity again increase from region 115b to region 115c to reduce restriction and facilitate drainage of captured coalesced liquid from the coalescer. The gradual change in both fiber diameter and porosity avoids the flow discontinuities and contaminant build-up discontinuities inherent in multi-media elements having different layers or sheets of different media material and/or different layers or sheets of different fiber diameter and/or different layers or sheets of different porosity. Instead, the gradual change in both fiber diameter and porosity in the present system, e.g. along the noted individual continuous fiber, eliminates step-change discontinuities and reduces restriction and increases service life of the coalescer. In a coalescer, capillary pressure holds the droplets in place. If a step-change is encountered, e.g. a large pore down to a small pore, then movement of the droplet is working against capillary pressure to get the droplet to move into the smaller pore, which significantly increases restriction. This undesirable characteristic is avoided in the present system by providing a gradual change, e.g. avoiding formation of different layers and trying to force droplets therethrough. For dispersed phase wetted media, this is particularly significant in the uphill portions 121, 122 of the noted U-shaped profile 123. For dispersed phase non-wetted media, this is particularly significant in the downhill portions 117, 118 of the noted U-shaped profile 123. The present system gradually varies the fiber diameter of the same such given individual fiber from a first diameter in a first annular region to a second diameter in a second annular region (e.g. from 115a to 115b and/or from 115b to 115c) to provide a gradual transition therebetween, eliminating abrupt step function changes and corresponding discontinuities, including in fluid flow velocity and pressure drop characteristics, which otherwise increase restriction and reduce life and capacity.

The above examples note annular element rolls having a closed loop shape, e.g. circular, oval, elliptical racetrack, triangular, rectangular, diamond, trapezoidal, star-shaped, and so on. In some applications, packaging or other reasons may dictate other shapes or open shapes, such as flat panel configurations. These may be made from the noted closed loop annular shape by cutting or splitting the resultant element axially along a plane parallel to the axis of the annulus to provide a panel element or the like or otherwise obtain a desired cross-section.

In the system of the '101 application, the diameter of individual fibers of the coalescer is controlled and varied along the length of the fiber. Fiber diameter, pore size and/or porosity are varied as a function of depth in the coalescer element and is accomplished using the same media and same media sheet, i.e. the same media and media sheet is used to obtain a wide range of properties. Fiber diameter, pore size and/or porosity may be varied continuously and gradually, eliminating the noted step-changes in media properties as a function of depth and avoiding the corresponding discontinuities in fluid flow velocity and pressure drop characteristics within the element, resulting in longer lasting elements. The noted gradual continuous changes may be achieved by varying and controlling the melt blown production parameters, including for example the distance between the die and mandrel/collector, the relative position of the die and mandrel to one another, polymer throughput, air pressure, flow rate, mandrel/collector speed, and temperature. Media properties as a function of depth may be varied and controlled by moving the die and collector relative to one another in the X, Y and/or Z directions. The system combines concepts to produce coalescers wherein fiber diameter, pore size and/or porosity vary as a function of depth giving performance advantages. There is no need to produce separate multiple layers in serial fashion, whether each layer is produced independently by different melt blowing machines and the unfinished element is transferred from machine to machine, or whether layering is accomplished by aligning multiple dies in serial fashion along the Z direction and continuously producing tubular elements that grow or progress in the same Z direction, with the finished element cut to length after the last die, with each die in the series producing a different layer with its own properties.

The system of the '101 application provides a method of making a coalescer element 115 by melt blowing a plurality of polymer fibers 107 onto a collector 108, and during the melt blowing, varying the diameter of individual fibers along their length such that an individual fiber has differing diameters at different points along its length. Fibers 107 are melt blown from die 103 ejecting melted polymer through spinnerets 106 to produce the fibers. Fiber diameter is varied along the length of the fiber during fiber production. Collector 108 is spaced from die 103, and in one embodiment fiber diameter along the length of the fiber is varied during fiber production by varying the spacing between collector 108 and die 103. When collector 108 is a rotating mandrel 109 in such embodiment, fiber diameter is varied along the length of the fiber during fiber production by varying the relative position of die 103 and mandrel 109 relative to one another along at least one of the X and Y axes. In another embodiment, fiber diameter is varied along the length of the fiber during fiber production by varying polymeric throughput through spinnerets 106. Polymer is ejected through spinnerets 106 into a pressurized gas stream, as noted above, to produce fibers 107. In another embodiment, fiber diameter is varied along the length of the fiber during fiber production by varying at least one of the gas pressure and gas flow rate. In another embodiment when collector 108 is a rotating mandrel 109, fiber diameter is varied along the length of the fiber during fiber production by varying the speed of rotation of mandrel 109. In another embodiment, fiber diameter is varied along the length of the fiber during fiber production by varying the temperature of the melted polymer. In another embodiment, two polymers are used simultaneously in the die to produce a bi-modal fiber distribution, with fiber diameter of each mode being varied as above described. In one embodiment, the two polymers have different melting points. In the preferred embodiment of the noted methods, fiber diameter is varied along the length of the fiber during fiber production while the fibers are being melt blown from die 103.

When collector 108 is a rotating mandrel 109, the rotating mandrel collects and rolls fibers 107 into an annular element roll 115 having an inner region 115a at the mandrel, and having an outer region 115c spaced radially outwardly of inner region 115a by the radial thickness of the element roll. Element roll 115 has a depth dimension along such radial thickness. Fiber diameter is varied along the length of the fiber during fiber production such that fiber diameter varies as a function of element depth. In one embodiment, as noted, fiber diameter is varied along the length of the fiber during fiber production to provide a first annular region such as 115a of a first fiber diameter, and a second annular region such as 115b and/or 115c of a second fiber diameter different than the first fiber diameter and of the same individual melt blown fiber. An individual fiber is melt blown from die 103. Such individual fiber is rolled on mandrel 109 to form the noted first annular region. The same such given individual fiber is rolled on the first annular region to form a second annular region such as 115b, and the same such given individual fiber is further rolled on second annular region 115b to form a third annular region such as 115c, and so on as desired. The given individual fiber is rolled at the noted first diameter in first annular region 115a, then the fiber diameter of the same such given individual fiber is gradually varied to a second diameter, and then the same such given individual fiber is rolled at such second fiber diameter in second annular region 115b, and so on. The given individual fiber may be rolled in other annular regions in sequential steps but still rolling the same such given individual fiber, thus providing the noted continuity and gradual changes and avoiding the above noted step-change discontinuities. The change in diameter of the given individual fiber occurs gradually during melt blowing, and the change from region to region across the radial thickness and depth of the element is gradual.

One of the inner and outer regions 115a and 115c is at an upstream surface, and the other of the inner and outer regions 115a and 115c is at a downstream surface. The direction of flow is from upstream to downstream. For example, in an inside-out flow geometry, region 115a is at the upstream surface, and region 115c is at the downstream surface. In an outside-in flow geometry, outer region 115c is at the upstream surface, and inner region 115a is at the downstream surface. In one embodiment, as above noted, fiber diameter is varied along the length of the fiber during fiber production to vary fiber diameter as a function of element depth such that fiber diameter decreases with increasing depth into the element along the flow direction. Further in such embodiment, the fibers are rolled such that porosity also decreases with increasing depth into the element along the flow direction. In another embodiment, fiber diameter along the length of the fiber is varied during fiber production to vary fiber diameter as a function of element depth such that fiber diameter increases with increasing depth into the element along the flow direction. Further in such embodiment, the fibers are rolled such that porosity also increases with increasing depth into the element along the flow direction. In another embodiment, fiber diameter along the length of the fiber is varied during fiber production to vary fiber diameter as a function of element depth such that fiber diameter decreases with increasing depth into the element along the flow direction from upstream to mid depth 115b, and then increases with increasing depth into the element along the flow direction from mid depth 115b to downstream. These characteristics are shown in FIG. 28 at U-shaped profile 123. Further in such embodiment, the fibers are rolled such that porosity decreases with increasing depth into the element along the flow direction from upstream to mid depth 115b, and then increases with increasing depth into the element along the flow direction from mid depth 115b to downstream. Typically, fiber diameter and porosity follow the same increasing or decreasing trend with respect to element depth, however not necessarily. For example, an element may have decreasing fiber diameter while porosity increases, or vice versa.

The system of the '101 application further provides a method of making a coalescer by melt blowing a plurality of polymer fibers onto a collector, and during the melt blowing, controllably varying the porosity of the coalescer formed by the fibers, e.g. by varying fiber diameter as above described and/or by the noted rolling. In one embodiment, porosity decreases with increasing depth into the coalescer. In another embodiment, porosity increases with increasing depth into the coalescer. In another embodiment, porosity decreases with increasing depth into the coalescer from upstream to mid depth 115b, and then increases with increasing depth into the coalescer from mid depth 115b to downstream, FIG. 28. In a further embodiment, porosity is controllably varied by providing a compression roller 116 engaging and applying pressure against coalescer element roll 115 at the outer surface at region 115c during formation thereof. In a further embodiment, porosity is varied to provide a first annular region such as 115a of a first porosity, a second annular region such as 115b of a second porosity different than the first porosity and of the same individual melt blown fiber, and a third annular region such as 115c of a third porosity different than the first and/or second porosity and of the same individual melt blown fiber, and so on. A given individual fiber is melt blown from die 103. Such given individual fiber is rolled on mandrel 109 to form first annular region 115a, and the same such given individual fiber is rolled on first annular region 115a to form second annular region 115b, and so on.

The system and method of the '101 application provides a coalescer having a plurality of melt blown fibers wherein the diameter of an individual fiber varies along the length of the fiber such that an individual fiber has differing diameters at different points along its length. Fiber diameter is varied along the length of the fiber to provide an individual fiber having differing diameters at different points along its length such that fiber diameter of such individual fiber varies as a function of coalescer depth. The coalescer has a first region such as 115a of a first fiber diameter, a second region such as 115b of a second fiber diameter different than the first fiber diameter and of the same individual melt blown fiber, and so on. As above noted, the change in fiber diameter is gradual to avoid the noted discontinuities and step-changes and the noted disadvantages inherent therein. In one embodiment, fiber diameter varies along the length of the individual fiber to vary fiber diameter as a function of element depth such that fiber diameter along the individual fiber decreases with increasing depth into the element. Further in such embodiment, porosity also preferably decreases with increasing depth into the element. In another embodiment, fiber diameter varies along the length of the individual fiber to vary fiber diameter as a function of element depth such that fiber diameter along the individual fiber increases with increasing depth into the element. In such embodiment, porosity also preferably increases with increasing depth into the element. In another embodiment, fiber diameter varies along the length of the individual fiber to vary fiber diameter as a function of element depth such that fiber diameter along the individual fiber decreases with increasing depth into the element from upstream to mid depth 115b, and then increases with increasing depth into the element from mid depth 115b to downstream, FIG. 28. In such embodiment, porosity preferably decreases with increasing depth into the element from upstream to mid depth 115b, and then increases with increasing depth into the element from mid depth 115b to downstream. The system provides a coalescer produced by the noted method of making a coalescer including melt blowing a plurality of polymer fibers onto a collector, and during the melt blowing, varying the diameter of individual fibers along their length such that an individual fiber has differing diameters at different points along its length.

The system and method also provides a coalescer having a plurality of melt blown fibers, with the coalescer having an upstream surface spaced from a downstream surface by a depth dimension therebetween, with the coalescer having a first depth region of a first porosity, and a second depth region downstream of the first depth region and of a second porosity different than the first porosity and of the same individual melt blown fiber of the first region. As above noted, the change is gradual to avoid the noted disadvantages of discontinuities or step-changes. In one embodiment, porosity decreases with increasing depth into the coalescer element. In another embodiment, porosity increases with increasing depth into the element. In another embodiment, porosity decreases with increasing depth into the element from upstream to mid depth 115b, and then increases with increasing depth into the element from mid depth 115b to downstream, FIG. 28. The system provides a coalescer produced by the noted method of making a coalescer by melt blowing a plurality of polymer fibers onto a collector, and during the melt blowing, controllably varying the porosity of the coalescer formed by the fibers.

It is expected that numerous of the above techniques may also be applied to particulate filters. For example, in a solids filter embodiment, the same polymer mixture may be used to achieve a bi-modal distribution, and the distance between the die 103 and mandrel 109 is increased at the beginning of element production at region 115a, then gradually decreased as the diameter of the element and the thickness of the media increases from region 115a to region 115b and 115c. As in the above example, this is accomplished by moving die 103 and mandrel 109 relative to one another in X and Z directions. This results in an element structure with finer fibers of both types in region 115a to facilitate the removal of fine particles at the downstream side of the element for outside-in flow geometry, and coarse particle and sludge removal by coarse fibers at the upstream side 115c in such outside-in flow geometry. Fiber diameter is at a minimum at region 115a and gradually increases to an increased fiber diameter at region 115b and continues to increase to a maximum fiber diameter at region 115c. Porosity is at a minimum at region 115a and increases to a higher porosity at region 115b and continues to increase to a maximum porosity at region 115c. Fiber diameter and porosity thus change as a function of distance from mandrel 109, i.e. as a function of radial thickness and filter depth dimension. This results in a net lowering of the total restriction across the filter element because restriction and efficiency gradually increase as the fluid penetrates further into the element. The gradual change in both fiber diameter and porosity avoids the flow and contaminant build-up discontinuities inherent in multi-media filters of multiple layers or sheets of different filter media of different fiber diameter and/or porosity. The noted gradual change eliminates step-change discontinuities and reduces restriction and increases service life.

Present Application

The present application provides a coalescer in which improved contaminant removal, life, and pressure drop are obtained in a smaller package size (volume), including for crankcase ventilation, oil mist and other coalescer applications.

Background

Diesel engine crankcase ventilation applications are extremely challenging from a filtration point of view. High concentrations of oil mist with average droplet size between 0.6 and 1.7 μm must be removed at greater than 90% efficiency to meet emission requirements and protect the engine turbocharger from fouling. Low restriction and long service life are required. For mobile applications, such as over-the-road trucks, the total package size of the system must also be very small. Coalescence is a promising technology for achieving these conflicting goals. However, current coalescer design practices and products fall short of these requirements, in that high removal efficiency or long service life or small size can be achieved, but current practice has been unable to simultaneously achieve all three in an acceptable fashion.

The design challenge for crankcase ventilation coalescers, indeed for all types of coalescers, is to maximize the amount of contaminant that can be removed and held within a given volume. Removal depends on the probability of contaminant being captured by media fibers. Removal increases with increasing amount of filter media. Filters and coalescers designed to remove contaminants larger than about 0.2 μm typically use pleated or fluted flat sheet media. Pleated coalescers utilize high media face area to reduce face velocity, increase capacity and life. To accomplish this thin, relatively tight (i.e., small pore size, fine fibers, low porosity) filter media is used that is susceptible to plugging when used for systems containing both liquid droplets and solid contaminants. In this case, the design strategy is to maximize the media face area. This maximizes the filter media per unit volume, minimizes the fluid velocity through the media, and increases the surface area upon which contaminant, particularly larger contaminants, can collect. With this approach, media is designed to be as thin as possible while maintaining efficiency and strength, in order to increase pleat density and total media face area. Pleat density is defined as the number of pleats per unit length and is equal to the inverse of the distance between pleat tips. With pleated media there is much wasted space between pleats. With cylindrical pleated elements, the optimum pleat height is 25% of the outer diameter of the element (Tadeusz Jaroszczyk et al., "Chapter 10 Cartridge Filtration", in *Filtration Principles and Practices. Second Edition, Revised and Expanded*, Michael Matteson and Clyde Orr, eds. Marcel Dekker, Inc. New York, 1987, p.547). For pleat heights more or less than this, the corresponding filter media face area of the element is reduced. Thus, 25% of the element volume is taken up by the internal cavity and does not directly contribute to contaminant removal. Hence, the media to element volume ratio for pleated elements is limited to a maximum of 75%. In actuality, this ratio if further reduced because pleats must be separated by a minimum spacing to allow the flow profile to develop and fully utilize the available pleat face area for removal. Without the spacing, only the portions of the element near the pleat tips are utilized. This results in increased pressure drop, inefficient utilization of media surface area, and decreased life. This unused space between pleats on both upstream and downstream sides of the media could otherwise be occupied by filter media. As a result, the ratio of media volume to element volume for circular cross-section pleated elements is actually less than 55%, and typically in the range of 25 to 50%.

An alternative design strategy to pleating relies on depth filter media formed into circular cross-section elements. Circular depth coalescers utilize the entire depth structure of the filter media to affect removal and attempt to maximize the diameter of the inner cavity to increase capacity and life. In contrast to pleated media, thick, relatively open (i.e., larger pore size, coarser fibers, higher porosity) filter media is used. While less susceptible to plugging than pleated media when coalescers of equivalent upstream media face area are compared, circular depth coalescers tend to be more susceptible to plugging than pleated media coalescers of the same size, because less face area can be packaged into the same volume. In the case of circular depth coalescers, the designer faces conflicting requirements:
  1. the media must be thick enough to attain the desired removal;
  2. the media must be thin enough to provide an acceptable (low enough) pressure drop; and
  3. the diameter of the internal cavity must be maximized.

The first two are in direct conflict, as removal and pressure drop both increase with increasing thickness, decreasing fiber diameter and porosity. Experience has shown the optimal coalescer thickness to be on the order of 3 to 7 mm. The can be explained using the coalescence models of L. Spielman et al., "Progress in Induced Coalescence and a New Theoretical Framework for Coalescence by Porous Media", *Flow through Porous* Media, R. Nunge, Chairman, ACS Publications, Washington, D.C., 1970; L. Spielman et al., "Theory of Coalescence by Flow through Porous Media", *Ind. Eng. Chem.* Fundamentals, 11:66-72, 1972; L. Spielman et al, "Experiments in Coalescence by Flow through Fibrous Mats.", *Ind. Ens. Chem.* Fundamentals, 11:73-83, 1972; L. Spielman et al., "Coalescence in Oil-in-Water Suspensions by Flow Through Porous Media", *Ind. Eng. Chem.* Fundamentals, 16:272-282, 1977. They modeled coalescers in terms of three regions. Region 1, located on the upstream side of the coalescer, is where droplet capture and growth occur. Region 2, located in the middle, is where capillary conduction of coalesced drops through the coalescer occurs. Region 3, located on the downstream side, is where coalesced drops exhibit further growth and are released. Region 1 is needed to capture and coalesce droplets. Region 3 is needed to ensure that coalesced drops are released without breakup. Region 2 is unnecessary, in that its function, capillary conduction, can be incorporated into Regions 1 and 3. For coalescer media thicker than 3 to 7 mm, the additional thickness beyond the optimal contributes to Region 2 and does not improve removal significantly while increasing the pressure drop.

For circular depth coalescers, it is desirable to maximize the diameter of the internal cavity in order to reduce solids plugging, increase life and minimize pressure drop. For low Reynolds Numbers, pressure drop is proportional to fluid velocity. For inside-to-outside flow elements in the absence of captured contaminant, the local restriction is inversely proportional to the radial distance from the center of the element. Thus, the local restriction is greatest at the upstream face of the element and decreases with distance into the media. When the media thickness exceeds 25% of the outer diameter of the element, pressure drop begins to increase nearly exponentially. The inner diameter ($D_I$) is given by the equation, $$D_I = D_O - 2t$$

where $D_O$ is the element outer diameter and t is the media thickness. This is one reason for designing circular depth coalescers to maximize the diameter of the internal cavity and for maintaining $D_I$ greater than 50% of $D_O$. Further, in the presence of contaminant, whether solids or droplets, the greatest contaminant buildup on the media occurs on the upstream side further increasing the local restriction. Coalescer life is directly proportional to the media face area on the upstream side. Increasing the diameter of the inner cavity or the height of the element, increases coalescer life proportionally. In order to meet minimal service life requirements, circular cross-section depth coalescer elements are designed to have the largest possible element outer diameter. If additional life is required, then element height (h) must be increased accordingly. For solids filters with circular depth media using outside-to-inside flow, media to element volume ratios on the order of 80% are used, since the outer perimeter controls capacity and life for these elements. For circular depth media coalescers with inside-to-outside flow, however, the ratio of media volume to element volume is less than 75%, and typically less than 30%.

Present System

The present application provides a coalescer that makes better use of the available space, in order to enhance removal, coalescer life, and/or reduce package size. It does so by combining the design strategies and resultant features used in pleated coalescers and circular depth coalescers into a novel design. It is particularly well suited for the removal of oil droplets from crankcase ventilation gases, but is also suitable for the removal of air borne oil and water mist, water droplets from diesel fuel, oil droplets from wastewater, and other coalescer applications. The system combines five features or characteristics to create a coalescer with unique performance advantages, in terms of removal, life and size.

These characteristics include:
  A. the use of fibrous depth filter media;
  B. a fiber diameter and porosity gradient profile across the media such that fiber diameter and/or porosity exhibit maxima at the upstream and downstream faces and pass through a minimum in between;
  C. a face area ratio of greater than or equal to 1.5 by forming the media into various closed loop, non-circular cross-sectional geometrical shapes;
  D. the dimensions and cross-sectional area of the inner cavity must be such that the maximum dynamic pressure within the inner cavity is less than 10% of the total pressure drop across the element; and
  E a media volume to element volume ratio greater than or equal to 50%, and preferably greater than or equal to 75%, obtained by
    using unpleated depth filter media,
    using closed loop cross-section geometrical shapes to minimize the cross-sectional area of the internal cavity,
    minimizing open spaces in the element not used for contaminant removal, including the space between pleats or flutes, space between layers of media or between the different coalescer, filter, and/or separator stages.

Some embodiments are illustrated in cross-sectional view in FIGS. 29-36. The preferred embodiment is the star-circle cross-section. Other preferred embodiments include the race-track, dog-bone, tri-lobe and multi-lobe geometries, which also give high face area ratios, to be described.

The coalescer is ideally used in an inside-to-outside flow configuration for closed loop geometries, but outside-to-inside flow is also possible. The inside-to-outside flow is preferred for coalescence, as it ensures that the local fluid velocity is lowest at the downstream face where coalesced drop release occurs. This minimizes the breakup of coalesced drops into smaller drops upon release. The disadvantage is decreased life, since there is less media face area on the upstream side to hold solids that may plug the coalescer. The present system minimizes this adverse effect. The system may be used with outside to inside flow, if application requirements dictate. In this case, life may be increased, but droplet removal is decreased and pressure drop is increased to some extent.

Characteristic A

The system utilizes fibrous depth filter media. Fibrous depth filter media refers to (1) media formed from nonwoven fibers, (2) media not used as flat sheets in pleated or fluted form, and (3) media in which contaminant is primarily removed within the depth of the filter media. The pores of the depth media tend to be larger than the contaminants being removed. Typically, depth filter media is greater than 10 mm thick and the media is layered or graded, with the media's properties varying as a function of depth. In contrast, surface filter media primarily remove contaminant at the surface to form a cake which actually accomplishes the bulk of the removal, while flat sheet media, e.g., cellulose, tend to be thinner and are used in pleated or fluted form. The preferred fibrous depth filter media is melt-blown filter media, as described in the above noted '101 application. Alternatively, other nonwoven fibrous filter media, including melt-blown, air-laid, wet-laid and vertical lapped filter media, can be used, provided it can be formed into the required element shape. Typically, the media is polymeric in nature, but microglass, cellulose, ceramic, or even metallic fibers may be used. Elements can be formed by melt-blowing or air-laying the media onto a rotating mandrel or by rolling flat sheets of media into the desired shape.

Characteristic B

The filter media exhibits a "U-shaped" fiber diameter and/or porosity distribution as a function of depth into the coalescer. The local average fiber diameter and/or porosity should exhibit maxima near the upstream and downstream faces and pass through a minimum in between. The initial decrease in fiber diameter and porosity as one goes from upstream face towards the center reduces the local restriction at the upstream face, despite the higher fluid velocity. Further, it provides graded capture of contaminants as a function of particle size. Large contaminants that cause plugging are captured in the initial more open, less restrictive layers, while smaller contaminants are removed near the minimum. This increases the solids-holding capacity and life of the coalescer. Within this upstream section, droplet capture and growth occur. Maximum removal efficiency and maximum restriction occur at the fiber diameter/porosity minimum. Downstream of the minimum, fiber diameter and porosity increase with increasing depth to facilitate the drainage of captured and coalesced droplets. Coalescers, as opposed to filters for solid contaminants, are designed to drain and release captured and coalesced drops, not to retain them. By increasing fiber diameter and porosity as one approaches the downstream face, the capillary forces acting on the coalesced drops are reduced, facilitating drainage and release of drops from the media. The maximum at the downstream face ensures that released drops are large, facilitating removal from the flow stream by settling.

Characteristic C

A face area ratio of greater than or equal to 1.5 is provided by forming the media into various closed loop, non-circular cross-sectional geometrical shapes. Coalescers are subject to solids plugging and shortened service life in applications with significant levels of solids. Plugging is caused by the rapid buildup of solids on the surface of the media and in its surface layers. For this reason, it is desirable to maximize the upstream media face area. Pleated elements are particularly well suited in this regard, while circular depth media elements suffer due to the relatively small media face area in the upstream internal cavity. Regardless of specific element dimensions, the ratio of the internal cavity perimeter ($L_I$) to its cross-sectional area ($A_I$) for elements with circular cross-section is given by:

$$\frac{L_I}{A_I} = \frac{4}{D_I}$$

where $D_I$ is the diameter of the internal cavity. In the current system, instead of a circular cross-section, closed-loop elements with inner cavity cross-sectional geometries are used such that the ratio of the internal cavity perimeter to its area exceeds that of a circle or:

$$\frac{L_I}{A_I} > \frac{4}{D_A}$$

$$D_A = \sqrt{\frac{4A_I}{\pi}}$$

where $D_A$ is the area equivalent diameter of the internal cavity as defined in the previous equation. Using this relationship, a face area ratio (F) can be defined as:

$$F = \frac{L_I D_A}{4A_I}$$

The increase in coalescer life relative to that of circular depth filter of the same height is given by the value of F. For pleated coalescer elements, F is on the order of 10 to 25 and is limited by the physical limitations of the filter media thickness and the required spacing between pleats. With the current system, F is typically between 1.5 and 15. These high values of F are achieved using unpleated media in closed-loop, noncircular element geometries, such as oval 124, FIG. 29, racetrack 125, FIG. 30, triangle 126, FIG. 31, dog bone 172, FIG. 32, multi-lobal such as tri-lobe 128, FIG. 33, rectangle including square 129, FIG. 34, trapezoid 130, FIG. 35, star-circle 131, FIG. 36, or other geometries. Several of these bear particular note. Oval, race-racetrack, dog-bone, multi-lobal and polygonal geometries can all be readily formed from initially cylindrical elements. Cylindrical elements can be readily transformed into these other shapes by compression, by forming them on correspondingly shaped mandrels, or other means. This facilitates manufacturing and production of these geometries. By increasing the length of racetrack or oval elements or of the legs of tri-lobal and multi-lobal elements, high values for F can be obtained. The dog-bone geometry has particular merit in that it is easily formed from a cylindrical tube and can be easily nested with like shapes, or even cylindrical elements for multiple element applications. With the star-circle geometry, high F values can be obtained by increasing the number and length of the points on the star. It is also significant that the geometry of the internal cavity and outside of the element not be the same, as seen in the star-circle geometry. Such an element could be produced by melt-blowing or rolling media onto a pleated element or star-shaped element.

An additional benefit of increasing the value of F is that long service life coalescers can be made with short element height, i.e., less than the longest chord of the element cross-section. This is because the height of elements no longer need be great in order to obtain the required service life. Instead, the increased inner cavity perimeter obtained using noncircular geometries provides increased media face area, increased dust-holding capacity, reduced face velocity, and longer life. In many applications in which a crankcase ventilation filter is mounted directly onto a engine, this provides a significant packaging advantage.

Characteristic D

The dimensions and cross-sectional shape of the inner cavity must be such that the maximum dynamic pressure within the inner cavity is less than 10% of the total pressure drop across the element. The cross-sectional area of the inner cavity is typically limited by the restriction as the fluid enters the inner cavity, rather than the restriction due to the media. The entrance restriction is created by flow entering the inner cavity through an orifice. With the present system, restriction is minimized by choice of internal cavity shape and dimensions such that the maximum dynamic pressure within the internal cavity is less than 10% of the total pressure drop across the element. The dynamic pressure ($P_D$) is defined as:

$$P_D = \frac{pV^2}{2}$$

where p is the fluid density and V is the fluid velocity. Computational fluid dynamics can be used to model the restriction and dynamic pressure for specific geometries in order to determine the maximum dynamic pressure in the internal cavity. This will determine the minimum cross-section of the internal cavity.

Characteristic E

Figure 36:
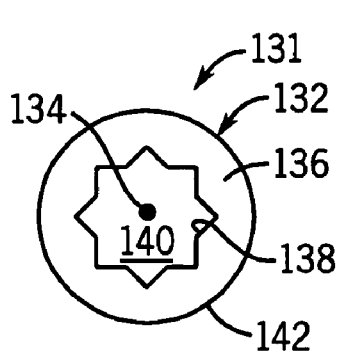
FIG. 36 is like FIG. 29 and shows another embodiment.
Figure 37:
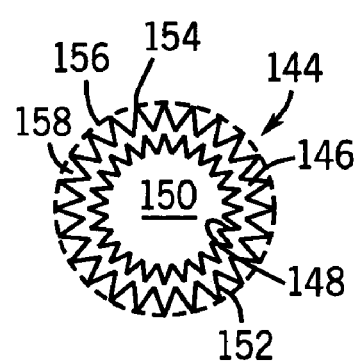
FIG. 37 is like FIG. 29 and shows another embodiment.

The coalescer has a differential volume ratio greater than or equal to 50%, and preferably greater than or equal to 75%. Differential volume ratio is the ratio of media volume to element volume. For example, FIG. 36 shows a coalescer 131 having a coalescer element 132 extending axially along an axis 134 (extending into the page) and having coalescer media 136. The element has a closed-loop cross-sectional geometrical shape, namely a star-circle shape in FIG. 36, in a plane (the plane of the page of FIG. 36) transverse to axis 134 and having an inner surface 138 defining an inner cavity 140, and having an outer surface 142 spaced outwardly of inner surface 138 by the thickness of element 132 between inner and outer surfaces 138 and 142. Media volume is the volume of media 136 between inner and outer surfaces 138 and 142. Element volume is the volume bounded by outer surface 142 including the volume of inner cavity 140. In the case of a pleated element 144, FIG. 37, having coalescer media 146 with an inner surface 148 defining an inner cavity 150, and having an outer surface 152 spaced outwardly of inner surface 148 by the thickness of element 144 between inner and outer surfaces 148 and 152, the element volume is the volume bounded by the profile of the outer pleat tips 154 as connected by an outer projection line extending therebetween which is shown in dashed line at 156, whereby element volume is the volume bounded by projection line surface 156 including the volume 158 between the outer pleats, the media volume, and the volume of inner cavity 150. In a non-pleated element such as in FIG. 36, the noted projection line boundary is coincident with the noted outer surface, e.g. 142.

The design challenge for coalescers is to maximize the amount of contaminant that can be removed within a given volume. Removal depends on the probability of contaminant being captured by media fibers. Removal increases with increasing amount of filter media. Thus, elimination of element volume underutilized with respect to removal is desirable. As previously noted, more than 25% of the total element volume is unavailable for removal with pleated and circular depth coalescers. In the present system, the underutilized space between pleats is filled with depth filter media. Further, through judicious selection of localized media fiber diameter and porosity properties, the U-shaped filter media profile, and minimized internal cavity cross-section, the amount of unavailable filter volume can be reduced to 5-25%. The ratio of media volume to element volume can exceed 75%. Typically, a ratio greater than 85% is used.

The present system provides a coalescer for coalescing a medium having two immiscible phases, namely a continuous phase and a dispersed phase. The continuous phase flows along a flow direction from upstream to downstream. The coalescer includes a coalescer element extending axially along an axis and having coalescer media capturing droplets of the dispersed phase, coalescingly growing the droplets into larger drops which further coalesce and grow to form pools that drain. The element has a closed-loop cross-sectional geometrical shape in a plane (e.g. the plane of the page in FIGS. 29-36) transverse to the noted axis (extending into the page of FIGS. 29-36), and having an inner surface such as 138 defining an inner cavity such as 140, and having an outer surface such as 142 spaced outwardly of the inner surface by the thickness of the element 132 between inner and outer surfaces 138 and 142. Media 136 has a depth dimension along such thickness. One of the inner and outer surfaces 138 and 142 is an upstream surface, and the other of the inner and outer surfaces 138 and 142 is a downstream surface. For example, in an inside-out flow coalescer, inner surface 138 is the upstream surface, and outer surface 142 is the downstream surface. In an outside-in flow coalescer, outer surface 142 is the upstream surface, and inner surface 138 is the downstream surface.

In the present system, at least two and preferably three and further preferably four and further preferably all five of the following criteria are met:
A) media 136 is fibrous depth media, preferably unpleated;
B) the media has a gradient profile with at least one parameter which varies as a function of depth into said media along the noted flow direction, and preferably the media has a gradient profile which varies as a function of depth into the media along the flow direction such that at least one of fiber diameter and porosity decreases with increasing depth into the media along the flow direction from upstream to mid-depth, and then increases with increasing depth into the media along the flow direction from mid-depth to downstream;
C) the element has an upstream face area provided by the upstream surface having a non-circular geometrical shape in the noted transverse plane, and preferably the element has a face area ratio F greater than or equal to 1.5, where $$F = \frac{L_I D_A}{4 A_I}$$

where $L_I$ is the length of the perimeter of the inner cavity, $D_A$ is the area equivalent diameter of the inner cavity, namely $$D_A = \sqrt{\frac{4 A_I}{\pi}}$$

where $A_I$ is the area of the inner cavity;
D) the inner cavity 140 has a minimum cross-sectional area selected according to pressure drop across the element, and preferably the element is an inside-out flow element and the minimum cross-sectional area of the inner cavity is selected such that the maximum dynamic pressure within the inner cavity is less than 10% of the total pressure drop across the element;
E) the coalescer has a differential volume ratio selected for space efficiency, where, as above noted, differential volume ratio is the ratio of media volume to element volume, where media volume is the volume of the media between the noted inner and outer surfaces, and element volume is the volume bounded by the noted outer surface including the volume of the noted inner cavity, and preferably the coalescer has a differential volume ratio greater than or equal to 50%, and further preferably the media is unpleated depth media and the differential volume ratio is greater than or equal to 75%.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations described herein may be used alone or in combination with other configurations. It is expected that various equivalents, alternatives and modifications are possible within the scope of the appended claims.

What is claimed is:

1. A single-stage crankcase ventilation coalescer for coalescing a medium having two immiscible phases, namely a continuous phase comprising air and a dispersed phase comprising oil as a fine mist having droplets of about one micron and smaller in diameter, said continuous phase flowing along a flow direction from upstream to downstream, said coalescer consisting essentially of a coalescer element extending axially along an axis and having coalescer media capturing droplets of said dispersed phase, coalescingly growing said droplets into larger drops which further coalesce and grow to form pools that drain, said element having a closed-loop cross-sectional geometrical shape in a plane transverse to said axis and having an inner surface defining an inner cavity and having an outer surface spaced outwardly of said inner surface by the thickness of said element between said inner and outer surfaces, said media having a depth dimension along said thickness, one of said inner and outer surfaces being an upstream surface, the other of said inner and outer surfaces being a downstream surface, wherein said media is unpleated fibrous depth media, said element and said media have an upstream face provided by said upstream surface, and said upstream face has a non-circular geometrical shape in said transverse plane, wherein said axis is horizontal relative to gravity and said continuous phase flows through said inner cavity along said axis, traversely through said inner surface, and traversely through said outer surface, said pools draining vertically through said media, and wherein:

said element has a face area ratio F greater than or equal to 1.5, where $$F = \frac{L_I D_A}{4A_I}$$

where $L_I$ is the length of the perimeter of said inner cavity, $D_A$ is the area equivalent diameter of said inner cavity, namely $$D_A = \sqrt{\frac{4A_I}{\pi}}$$

where $A_I$ is the area of said inner cavity;

wherein optionally one or more of the following three criteria are met:

A) said media has a gradient profile with at least one parameter which varies as a function of depth into said media along said flow direction;

B) said inner cavity has a minimum cross-sectional area selected according to pressure drop across said element; and C) said coalescer has a differential volume ratio selected for space efficiency, wherein said differential volume ratio is the ratio of media volume to element volume, where media volume and element volume are as defined in the specification.

2. The coalescer according to claim 1 wherein at least two of criteria A through C are met.

3. The coalescer according to claim 1 wherein all three of said criteria A through C are met.

4. The coalescer according to claim 1 wherein criteria A is met, and wherein criteria A further requires that said media has a gradient profile which varies as a function of depth into said media along said flow direction such that at least one of fiber diameter and porosity varies as a function of depth.

5. The coalescer according to claim 4 wherein said at least one of fiber diameter and porosity decreases with increasing depth into said media along said flow direction from upstream to mid-depth, and then increases with increasing depth into said media along said flow direction from mid-depth to downstream.

6. The coalescer according to claim 1 wherein said geometrical shape is an oval shape.

7. The coalescer according to claim 1 wherein said geometrical shape is a racetrack shape.

8. The coalescer according to claim 1 wherein said geometrical shape is a triangle shape.

9. The coalescer according to claim 1 wherein said geometrical shape is a dog bone shape.

10. The coalescer according to claim 1 wherein said geometrical shape is a tri-lobe shape.

11. The coalescer according to claim 1 wherein said geometrical is a rectangle shape.

12. The coalescer according to claim 11 wherein said rectangle shape is a square shape.

13. The coalescer according to claim 1 wherein said geometrical shape is a trapezoid shape.

14. The coalescer according to claim 1 wherein said geometrical shape is a star-circle shape, namely said inner surface has a star shape, and said outer surface has a circle shape.

15. The coalescer according to claim 1 wherein said inner and outer surfaces have different geometrical shapes.

16. The coalescer according to claim 1 wherein criteria B is met, and wherein criteria B further requires that the minimum cross-sectional area of said inner cavity is selected such that the maximum dynamic pressure within said inner cavity is less than 10% of the total pressure drop across said element.

17. The coalescer according to claim 16 wherein said inner surface is said upstream surface, and said outer surface is said downstream surface, such that said element is an inside-out flow element.

18. The coalescer according to claim 1 wherein criteria C is met, and wherein criteria C further requires that said coalescer has a differential volume ratio greater than or equal to 50%.

19. The coalescer according to claim 18 wherein criteria C further requires that said differential volume ratio is greater than or equal to 75%.

20. The coalescer of claim 1, wherein the coalescer consists of said coalescer element.

21. A single-stage crankcase ventilation coalescer for coalescing a medium having two immiscible phases, namely a continuous phase comprising air and a dispersed phase comprising oil as a fine mist having droplets of about one micron and smaller in diameter, said continuous phase flowing along a flow direction from upstream to downstream, said coalescer consisting essentially of a coalescer element extending axially along an axis and having coalescer media capturing droplets of said dispersed phase, coalescingly growing said droplets into larger drops which further coalesce and grow to form pools that drain, said element having a closed-loop cross-sectional geometrical shape in a plane transverse to said axis and having an inner surface defining an inner cavity and having an outer surface spaced outwardly of said inner surface by the thickness of said element between said inner and outer surfaces, said media having a depth dimension along said thickness, one of said inner and outer surfaces being an upstream surface, the other of said inner and outer surfaces being a downstream surface, wherein said inner surface is said upstream surface, and said outer surface is said downstream surface, such that said element is an inside-out flow element, wherein said media is unpleated fibrous depth media, said element and said media have an upstream face provided by said upstream surface and said downstream surface, and said upstream face has a non-circular geometrical shape in said transverse plane, wherein said axis is horizontal relative to gravity and said continuous phase flows through said inner cavity along said axis, traversely through said inner surface, and traversely through said outer surface, said pools draining vertically through said media, wherein said coalescer element has a first cross-sectional area along a first horizontal plane perpendicular to said upstream face, and a second cross-sectional area along a second horizontal plane perpendicular to said upstream face, said second horizontal plane being vertically below said first horizontal plane, said second cross-sectional area being less than said first cross-sectional area wherein said coalescer element has a perimeter defining a given shape in a vertical plane parallel to said upstream face, said perimeter having a plurality of chords thereacross, including vertical chords and horizontal chords and the longest of said chords extends vertically, and wherein:

said element has a face area ratio F greater than or equal to 1.5, where $$F = \frac{L_I D_A}{4 A_I}$$

where $L_I$ is the length of the perimeter of said inner cavity, $D_A$ is the area equivalent diameter of said inner cavity, namely $$D_A = \sqrt{\frac{4 A_I}{\pi}}$$

where $A_I$ is the area of said inner cavity;

wherein optionally one or more of the following three criteria are met:

A) said media has a gradient profile with at least one parameter which varies as a function of depth into said media along said flow direction;

B) said inner cavity has a minimum cross-sectional area selected according to pressure drop across said element; and C) said coalescer has a differential volume ratio selected for space efficiency, wherein said differential volume ratio is the ratio of media volume to element volume.

22. The coalescer according to claim 21 wherein at least two of criteria A through C are met.

23. The coalescer according to claim 21 wherein all three of said criteria A through C are met.

24. The coalescer according to claim 21 wherein criteria A further requires that said media has a gradient profile which varies as a function of depth into said media along said flow direction such that at least one of fiber diameter and porosity varies as a function of depth.

25. The coalescer according to claim 24 wherein said at least one of fiber diameter and porosity decreases with increasing depth into said media along said flow direction from upstream to mid-depth, and then increases with increasing depth into said media along said flow direction from mid-depth to downstream.

26. The coalescer according to claim 21 wherein said geometrical shape is an oval shape.

27. The coalescer according to claim 21 wherein said geometrical shape is a racetrack shape.

28. The coalescer according to claim 21 wherein said geometrical shape is a triangle shape.

29. The coalescer according to claim 21 wherein said geometrical is a rectangle shape.

30. The coalescer according to claim 29 wherein said rectangle shape is a square shape.

31. The coalescer according to claim 21 wherein said geometrical shape is a trapezoid shape.

32. The coalescer according to claim 21 wherein said inner and outer surfaces have different geometrical shapes.

33. The coalescer according to claim 21 wherein criteria B is met, and wherein criteria B further requires that the minimum cross-sectional area of said inner cavity is selected such that the maximum dynamic pressure within said inner cavity is less than 10% of the total pressure drop across said element.

34. The coalescer according to claim 21 wherein criteria C is met, and wherein criteria C further requires that said coalescer has a differential volume ratio greater than or equal to 50%.

35. The coalescer according to claim 34 wherein criteria C further requires that said differential volume ratio is greater than or equal to 75%.

36. The coalescer according to claim 21, wherein the coalescer consists of said coalescer element.

* * * * *